(12) United States Patent
An et al.

(10) Patent No.: US 11,576,110 B2
(45) Date of Patent: Feb. 7, 2023

(54) BLUETOOTH NETWORK, COMMUNICATION METHOD, APPARATUS, AND STORAGE MEDIUM THEREOF

(71) Applicant: Alibaba Group Holding Limited, Grand Cayman (KY)

(72) Inventors: Qing An, Hangzhou (CN); Dapeng Liu, Hangzhou (CN); Xiaobo Yu, Hangzhou (CN); Hao Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 222 days.

(21) Appl. No.: 17/012,895

(22) Filed: Sep. 4, 2020

(65) Prior Publication Data

US 2021/0099948 A1 Apr. 1, 2021

(30) Foreign Application Priority Data

Sep. 30, 2019 (CN) .......................... 201910943308.2

(51) Int. Cl.
*H04W 48/16* (2009.01)
*H04W 84/20* (2009.01)

(52) U.S. Cl.
CPC ............ *H04W 48/16* (2013.01); *H04W 84/20* (2013.01)

(58) Field of Classification Search
CPC ....... H04W 48/16; H04W 84/20; H04W 4/80; H04W 4/06
See application file for complete search history.

(56) References Cited

U.S. PATENT DOCUMENTS

| | | | |
|---|---|---|---|
| 8,045,922 B2 | 10/2011 | Sherman et al. |
| 8,515,351 B2 | 8/2013 | Grushkevich |
| 8,620,379 B2 | 12/2013 | Zhodzishsky et al. |
| 8,904,499 B2 | 12/2014 | Hinsey |
| 8,971,807 B2 | 3/2015 | Hillyard |
| 9,154,218 B2 | 10/2015 | Cha |
| 9,357,574 B2 | 5/2016 | Lee et al. |
| 9,363,628 B2 | 6/2016 | Viswanadham et al. |
| 9,532,311 B1 | 12/2016 | Chhabra et al. |
| 9,813,845 B2 | 11/2017 | Kim et al. |
| 9,860,680 B2 | 1/2018 | Tian et al. |
| 10,159,044 B2 | 12/2018 | Hrabak |

(Continued)

OTHER PUBLICATIONS

International Search Report and Written Opinion to corresponding International Application No. PCT/US20/49595 dated Dec. 4, 2020 (25 pages).

*Primary Examiner* — Lewis G West
(74) *Attorney, Agent, or Firm* — James J. DeCarlo; Greenberg Traurig, LLP

(57) ABSTRACT

Embodiments of the disclosure provide a Bluetooth network, a communication method, an apparatus, and a storage medium thereof. In the embodiments of the disclosure, a Bluetooth network comprises a Bluetooth node configured with a forwarding capability and serving as a non-leaf node, and a Bluetooth node functioning in a Bluetooth advertising mode to serve as a leaf node. Each leaf node is connected to at least one of one or more non-leaf nodes. Via the forwarding capability of the non-leaf node, the leaf node communicates with other leaf nodes or non-leaf nodes not within its signal coverage, thereby extending a communication range of a Bluetooth node.

17 Claims, 9 Drawing Sheets

(56) References Cited

U.S. PATENT DOCUMENTS

| | | | |
|---|---|---|---|
| 10,530,689 B2* | 1/2020 | Liao | H04W 84/18 |
| 10,932,107 B2* | 2/2021 | Bae | H04W 4/80 |
| 11,172,498 B2* | 11/2021 | Aijaz | H04W 72/082 |
| 11,269,695 B1* | 3/2022 | Klein | H04L 67/1074 |
| 2004/0064522 A1* | 4/2004 | Zhang | H04L 67/104 |
| | | | 709/214 |
| 2013/0109315 A1 | 5/2013 | Polo et al. | |
| 2014/0153444 A1* | 6/2014 | Zhou | H04W 40/005 |
| | | | 370/256 |
| 2016/0134539 A1* | 5/2016 | Hui | H04L 12/18 |
| | | | 709/223 |
| 2016/0184635 A1 | 6/2016 | Kwon | |
| 2016/0227017 A1* | 8/2016 | Kotab | H04L 41/30 |
| 2017/0223615 A1 | 8/2017 | Lee et al. | |
| 2018/0124550 A1* | 5/2018 | Kwon | H04W 4/80 |
| 2020/0084654 A1* | 3/2020 | Kwan | H04W 40/22 |
| 2020/0092121 A1* | 3/2020 | Skillermark | H04W 40/32 |
| 2020/0314735 A1* | 10/2020 | Aijaz | H04W 52/46 |
| 2021/0099948 A1* | 4/2021 | An | H04W 48/16 |
| 2021/0234703 A1* | 7/2021 | Li | G06F 21/602 |
| 2021/0352764 A1* | 11/2021 | Hamlin | H04W 12/06 |

* cited by examiner

BLUETOOTH NETWORK, COMMUNICATION METHOD, APPARATUS, AND STORAGE MEDIUM THEREOF

CROSS-REFERENCE TO RELATED APPLICATIONS

The application claims priority to the Chinese Patent Application No. 201910943308.2, filed on Sep. 30, 2019, which is incorporated by reference herein in its entirety.

BACKGROUND

Technical Field

The disclosure relates to the technical field of wireless communications, and in particular to Bluetooth networks, and Bluetooth communication methods, apparatuses, and storage media thereof.

Description of Related Art

To break through range constraints of a Bluetooth device, the Bluetooth Special Interest Group (SIG) released the Bluetooth Mesh Profile. The Bluetooth Mesh Profile is a Bluetooth profile established based on Bluetooth Low Energy (BLE) standards. The Bluetooth Mesh Profile implements a mesh network topology, supports multi-hop connections, and extends Bluetooth network coverage.

However, the Bluetooth Mesh Profile has specific requirements for hardware capabilities of a Bluetooth device, requiring sufficient processor computing power, and read-only memory (ROM) storage capacity for execution. As such, resource-constrained Bluetooth devices (e.g., a wireless button, a temperature/humidity sensor, etc.) cannot satisfactorily support the Bluetooth Mesh Profile.

SUMMARY

Embodiments of the disclosure provide Bluetooth networks, communication methods, apparatuses, and storage media thereof to provide a novel Bluetooth networking solution, thereby extending the communication range of a Bluetooth device, and reducing the capability requirement of a Bluetooth device.

In one embodiment, the disclosure provides a Bluetooth network, the Bluetooth network comprising: a plurality of Bluetooth nodes, the plurality of Bluetooth nodes comprising one or more non-leaf nodes and one or more leaf nodes, the one or more leaf nodes being connected to at least one of the one or more non-leaf node and configured for receiving Bluetooth advertising data received and transmitted by the one or more non-leaf nodes in connection; or forwarding the Bluetooth advertising data via the non-leaf node in connection, and the one or more non-leaf nodes being communicatively connected to each other and configured for receiving and advertising the forwarded Bluetooth advertising data from the one or more leaf nodes.

In one embodiment, the disclosure provides a communication method for a Bluetooth network, the communication method comprising: receiving, by a non-leaf node in the Bluetooth network, Bluetooth advertising data from a leaf node in Bluetooth network data; determining whether the Bluetooth advertising data is destined for the non-leaf node; in response to determining the Bluetooth advertising data not destined for the non-leaf node, advertising to forward the Bluetooth advertising data; and in response to determining the Bluetooth advertising data destined for the non-leaf node, accepting and performing subsequent processing on the Bluetooth advertising data.

In one embodiment, the disclosure provides a communication method for a Bluetooth network, the communication method comprising: receiving, by a slave node in the Bluetooth network, a request transmitted by another node to search for a master node; determining, by a slave node, whether its hardware capability of the slave node meets the requirements of becoming a master node; in response to determining that the hardware capability meets the requirements of becoming a master node, serving as a candidate slave node; and transmitting, a request to become a master node; and in response to determining that the hardware capability does not meet the requirements of becoming a master node, otherwise, discarding the request to search for the master node.

In one embodiment, the disclosure provides a network node, the network node comprising: a memory; a processor coupled to the memory; and a communication component. The processor is configured to receive data by the communication component. The memory is configured to store a computing program that, when executed by the processor, instructs the network node to process the received data.

Embodiments of the disclosure provide a novel Bluetooth network to include a Bluetooth node configured with forwarding capability to serve as a non-leaf node, and a Bluetooth node functioning in a Bluetooth advertising mode to serve as a leaf node. Each leaf node is connected to at least one non-leaf node. Assisted with the forwarding capability of the non-leaf node, the leaf node communicates with another leaf nodes or non-leaf nodes that are not within its signal coverage, thereby extending a communication range of a Bluetooth node. Further, the leaf node needs to support only the Bluetooth advertising mode, which leads to lowered requirements for the hardware capability of the leaf node, eliminating the constraint imposed by the hardware capability of a Bluetooth node.

BRIEF DESCRIPTION OF THE DRAWINGS

The accompanying drawings described herein are used for providing further understanding of the disclosure and are some embodiments of the disclosure. Further, embodiments of the disclosure and the description thereof are used for explaining the disclosure, rather than presenting any limitation on the disclosure.

DETAILED DESCRIPTION

To make the objectives, technical solutions, and advantages of the disclosure clearer, the technical solutions in the disclosure will be clearly and completely described below with reference to the embodiments and the accompanying drawings of the disclosure. The embodiments described herein are merely some rather than all of the embodiments of the disclosure. All other embodiments obtained by those skilled in the art based on embodiments of the disclosure without making significant efforts fall within the scope of the disclosure.

To address the technical problem that existing Bluetooth devices, constrained in hardware capabilities, cannot fully support the Bluetooth Mesh Profile to connect to a Bluetooth mesh network, embodiments of the disclosure provide a novel Bluetooth network. The Bluetooth network includes a Bluetooth node configured with forwarding capability as a non-leaf node, and a Bluetooth node functioning in a Bluetooth advertising mode as a leaf node. Each leaf node is connected to at least one non-leaf node. Assisted with the forwarding capability of the non-leaf node, the leaf node communicates with another leaf nodes or non-leaf nodes that are not within the signal coverage area of the leaf node, thereby extending the communication range of the Bluetooth node. Further, the leaf node needs to support only the Bluetooth advertising mode, which leads to lowered requirements for hardware capabilities of the leaf node, eliminating the constraint imposed by the hardware capability of the Bluetooth node.

The technical solutions provided by embodiments of the disclosure are described in detail below with reference to the accompanying drawings.

Figure 1:
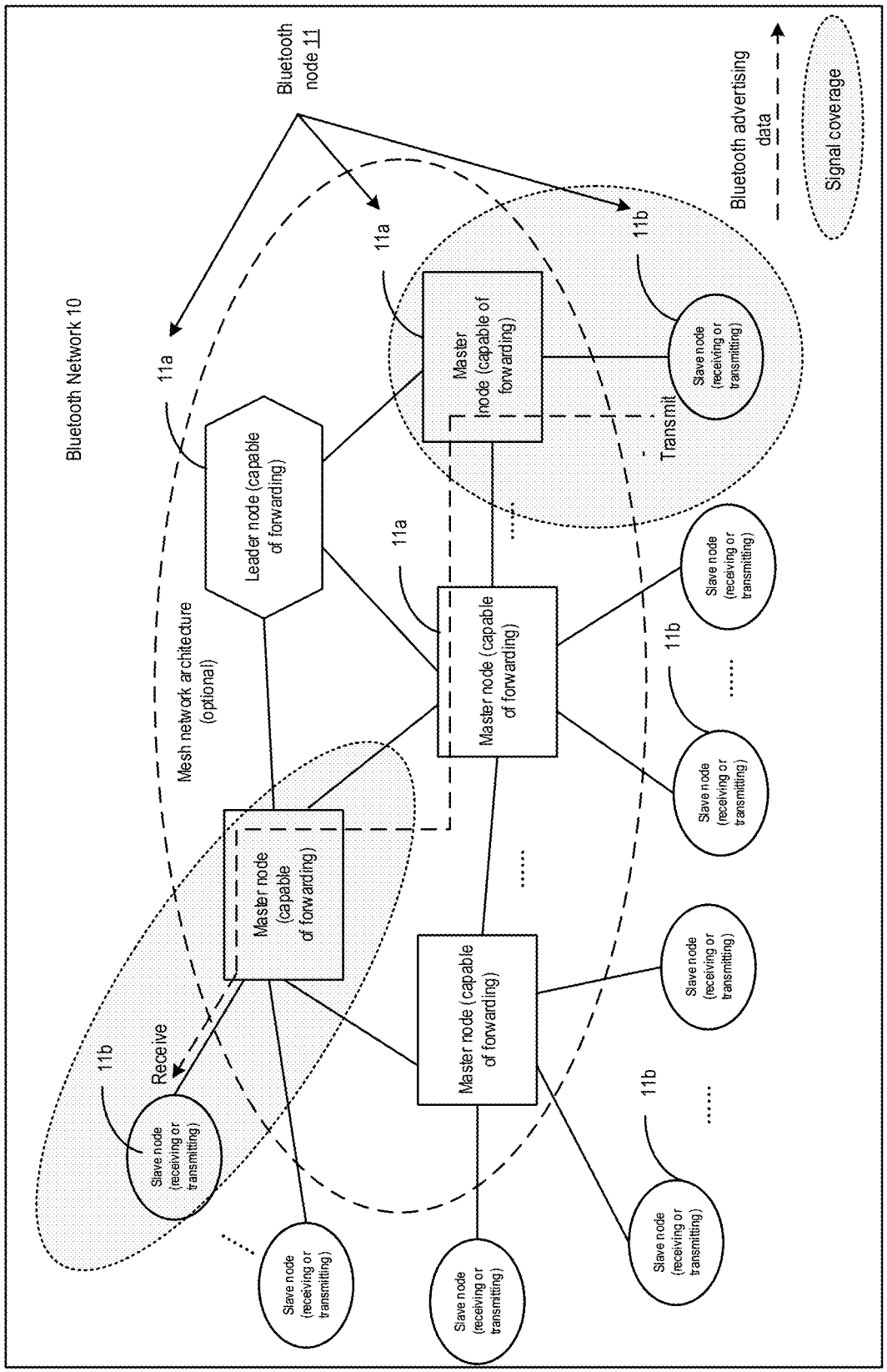
FIG. 1 is a block diagram illustrating a Bluetooth network according to some embodiments of the disclosure.

FIG. 1 is a block diagram illustrating a Bluetooth network disclosure according to some embodiments of the disclosure. As shown in FIG. 1, the Bluetooth network 10 includes a plurality of Bluetooth nodes 11. As used herein, a Bluetooth node 11 refers to a Bluetooth device supporting Bluetooth communication protocols. In one example, the Bluetooth node 11 includes, but not limited to, a Bluetooth-enabled mobile phone, headset, speaker, switch, television, lamp, bracelet, etc. Bluetooth communication protocols include a plurality of standards, such as Bluetooth 1.0, Bluetooth 2.0, Bluetooth 3.0, Bluetooth 4.0 (BTLE), etc. Embodiments of the disclosure are applicable without limitation to the Bluetooth node 11 supporting any particular Bluetooth standard. That is, the plurality of Bluetooth nodes 11 can support Bluetooth communication protocols of the same Bluetooth standard or different Bluetooth standards.

As illustrated, in the Bluetooth network 10, the plurality of Bluetooth nodes 11 includes one or more non-leaf nodes 11a and one or more leaf nodes 11b. The one or more non-leaf nodes node 11a are communicatively connected to each other. In some embodiments, the non-leaf nodes 11a are directly communicatively connected to each other. In other embodiments, the non-leaf nodes 11a are indirectly communicatively connected to each other. Each leaf node 11b is connected to at least one of the one or more non-leaf nodes 11a. That is, each leaf node 11b is located within the signal coverage of at least one of the one or more non-leaf nodes 11a and is in direct communication with the non-leaf nodes 11a. As used herein, a communication connection refers to a Bluetooth-enabled connection. In the example illustrated in FIG. 1, each leaf node 11b is connected to one non-leaf node 11a.

The one or more non-leaf nodes 11a are configured with the forwarding capability such that the one or more non-leaf nodes 11a are configured to forward Bluetooth advertising data from other nodes. Each non-leaf node 11a is communicatively connected to a plurality of other nodes (including both a leaf node and/or a non-leaf node) such that the other nodes are interconnected. The one or more non-leaf nodes 11a are configured to support a Bluetooth communication standard enabling network interconnections and forwarding capabilities. In one example, the Bluetooth standard is a Bluetooth communication protocol of a relatively high version, such as Bluetooth 4.0 and above. In some embodiments, the non-leaf nodes 11a are configured to include a Bluetooth device equipped with relatively high computing power (e.g., a Bluetooth mobile phone, a Bluetooth television, a Bluetooth speaker, etc.).

The leaf nodes 11b are nodes located at the edge of the Bluetooth network 10, and function in a Bluetooth advertising mode. In the Bluetooth advertising mode, the primary function of the leaf nodes 11b is to receive or transmit Bluetooth advertising data within their respective signal coverage. Presently, Bluetooth communication standards of all versions support a Bluetooth advertising mode. As such, a Bluetooth device supporting a Bluetooth communication standard of any version can serve as the leaf node 11b. Therefore, Bluetooth devices not supporting, or not satisfactorily supporting, a Bluetooth communication standard of a relatively high version due to its limited hardware capability can use the networking methods, provided according to embodiments of the disclosure, to serve as the leaf nodes to extend their communication ranges, using the forwarding capability of the non-leaf nodes. In some embodiments, Bluetooth devices with relatively high hardware capabilities are also configured as leaf nodes.

In this example, the non-leaf nodes 11a not only are configured with a forwarding capability but also communicate with other non-leaf nodes 11a or leaf nodes 11b. For any non-leaf node 11a, if the other non-leaf nodes 11a or the leaf nodes 11b requiring communication is within its signal coverage, the non-leaf node 11a directly communicates with the other non-leaf nodes 11a or the leaf nodes 11b that request communication. If the other non-leaf nodes 11a or the leaf nodes 11b requesting communication is not within the signal coverage of the non-leaf node 11a, the non-leaf node 11a indirectly communicates with, via the forwarding capability of other non-leaf nodes 11a in the vicinity, the other non-leaf nodes 11a or the leaf nodes 11b requesting communication.

In some embodiments, the leaf node 11b directly communicates with other leaf nodes 11b within its signal coverage, or communicates with, via forwarding capability of a non-leaf node 11a, other leaf nodes 11b not within its signal coverage. In some embodiments, the leaf node 11b directly communicates with a non-leaf node 11a within its signal coverage, or communicates with, via the forwarding capability of a non-leaf node 11a, a non-leaf node 11a not within its signal coverage thereof.

In one example, a leaf node A is configured to communicate with a leaf node B or a non-leaf node C, both not within the signal coverage of leaf node A. Leaf node A communicates with leaf node B or non-leaf node C via the non-leaf nodes located within the respective signal coverages. That is, Bluetooth advertising data transmitted by leaf node A is received by non-leaf nodes within the signal coverage of leaf node A. Non-leaf nodes determine that the Bluetooth advertising data is not destined for itself, and in turn advertises to forward the Bluetooth advertising data. After being forwarded by one or more non-leaf nodes, the Bluetooth advertising data reaches the non-leaf node(s) within the signal coverage of leaf node B, or non-leaf node C. The non-leaf nodes determine that the Bluetooth advertising data is not destined for itself, in turn advertise to forward the Bluetooth advertising data. As a result, leaf node B or on-leaf node C receives the Bluetooth advertising data. Leaf node B or non-leaf node C determines that the Bluetooth advertisement signal is destined for itself and accepts the Bluetooth advertising data and performs subsequent processing on the advertising data.

Embodiments of the disclosure provide a novel Bluetooth network to include a Bluetooth node configured with forwarding capability to serve as a non-leaf node, and a Bluetooth node functioning in a Bluetooth advertising mode to serve as a leaf node. Each leaf node is connected to at least one non-leaf node. Assisted with the forwarding capability of the non-leaf node, the leaf node communicates with another leaf node or a non-leaf node that is not within its signal coverage area, thereby extending a communication range of a Bluetooth node. Further, the leaf node needs to support only the Bluetooth advertising mode, which leads to lowered requirements for the hardware capability of the leaf node, eliminating the constraint imposed by the hardware capability of a Bluetooth node.

Further, when a plurality of non-leaf nodes are provided, leaf nodes can be distributed to connect to different non-leaf nodes. As such, the burden on each non-leaf is relatively low, thereby reducing power consumption incurred on each non-leaf node.

According to various embodiments of the disclosure, the non-leaf node 11a is configured to forward Bluetooth advertising data from the leaf node 11b, or from other non-leaf nodes node 11a. Any suitable techniques (e.g., broadcasting, managed flooding, advertising, etc.) can be applied to the non-leaf node 11a to forward the Bluetooth advertising data. In some embodiments, the non-leaf node 11a is configured to forward the Bluetooth advertising data in an advertising mode. Such forwarding is herein referred to as advertising to forward.

In some embodiments, to prevent flooding caused by unlimited advertisement, a threshold such as a maximum number of times a packet can be forwarded is pre-configured in the non-leaf node 11a. Therefore, upon receiving the Bluetooth advertising data, the non-leaf node 11a determines whether a destination address of the Bluetooth advertising data matches its own address. If the destination address of the received Bluetooth advertising data is not the address of the non-leaf node 11a, it is determined that the Bluetooth advertising data is not destined for the non-leaf node 11a, and the Bluetooth advertising data needs to be advertised (e.g., forwarded). If Bluetooth advertising data not destined for the non-leaf node is received, a TTL (Time to Live) value of the received Bluetooth advertising data is checked to determine whether the TTL value reaches the configured threshold. If the TTL value does not reach the configured threshold, the TTL value is increased by a pre-configured step value, after which the Bluetooth advertising data is advertised. If the TTL value reaches the configured threshold, the Bluetooth advertising data is discarded and not forwarded. The value of the pre-configured threshold and the value of the configured step can be configured with any suitable values without limitation. In some embodiments, the value of the pre-configured threshold and the value of the configured step are flexibly configured based on application requirements. In some embodiments, the configured step value is one (1). That is, the TTL value is increased by one (1) upon each forwarding.

In some embodiments, the non-leaf node 11a is configured to store Bluetooth advertising data that has been previously forwarded. In one example, the Bluetooth advertising data is cached locally. Upon receiving Bluetooth advertising data not destined for the non-leaf node 11a, the non-leaf node 11a is configured to compare the received Bluetooth advertising data with the stored Bluetooth advertising data previously forwarded. If the received Bluetooth advertising data is not the same as the Bluetooth advertising data previously forwarded, the Bluetooth advertising data is advertised, and advertising data is stored. If the received Bluetooth advertising data is the same as the Bluetooth advertising data previously forwarded, the Bluetooth advertising data is discarded and not advertised. As such, waste of resources due to repeated transmission of the same data in the network is reduced, conserving network resources. The method for storing the Bluetooth advertising data in the non-leaf node 11a is not limited to locally caching the Bluetooth advertising data. In some embodiments, the Bluetooth advertising data is stored in a local memory or hard disk, or stored in a database, or the like. Locally caching the Bluetooth advertising data that has been previously forwarded reduces the time spent in reading the Bluetooth advertising data from memory, hard disk, database, etc., improving the comparison operation efficiency and leading to improved forwarding efficiency.

For any non-leaf node 11a, the above-described data forwarding method employing a TTL value and the above-described data forwarding method employing stored Bluetooth advertising data that has been previously forwarded are used in either an exclusive manner or in combination. When the two data forwarding methods are used in combination, upon receiving Bluetooth advertising data not destined for the non-leaf node 11a, the non-leaf node 11a checks whether a TTL value of the received Bluetooth advertising data reaches the configured threshold, and compares the received Bluetooth advertising data with the stored Bluetooth advertising data previously forwarded. If the TTL value of the received Bluetooth advertising data does not reach the configured threshold, and the Bluetooth advertising data is not same as the Bluetooth advertising data previously forwarded, the Bluetooth advertising data is advertised. If the TTL value of the received Bluetooth advertising data reaches the configured threshold, or if the Bluetooth advertising data is the same as the Bluetooth advertising data previously forwarded, the Bluetooth advertising data is discarded.

Embodiments of the disclosure are applicable to, without limitation, to any network topology structure formed among one or more non-leaf nodes 11a, as long as the or more non-leaf nodes 11a communicate with each other. For example, various network topologies such as a star-shaped network topology, a tree topology, a ring topology, and a mesh topology can be formed among the one or more non-leaf nodes 11a.

In one embodiment, and as shown in FIG. 1, the one or more non-leaf nodes 11a communicate with each other to form a mesh network topology. Based on the mesh network topology created among the one or more non-leaf nodes 11a, the Bluetooth network 10 illustrates an embodiment of a novel Bluetooth mesh network provided by the disclosure.

As shown in FIG. 1, the Bluetooth mesh network 10 includes one or more non-leaf nodes 11a and one or more leaf node 11b. The one or more non-leaf nodes 11a communicate with each other to form a mesh network topology. A non-leaf node 11a is connected to one or more leaf nodes 11b. In some embodiments, the non-leaf node 11a is not connected to any leaf node 11b. Each leaf node 11b is connected to at least one of the one or more non-leaf nodes 11a. The leaf node 11b receives Bluetooth advertising data transmitted or forwarded by the non-leaf node 11a to which the leaf node 11b is connected. The leaf node 11b also transmits Bluetooth advertising data to the non-leaf node 11a to which the leaf node 11b is connected, or forwards the Bluetooth advertising data via the non-leaf node 11a to which the leaf node 11b is connected. In an exemplary Bluetooth mesh network, all of the non-leaf nodes 11a are connected to each other, and a plurality of connection channels is provided between any two non-leaf nodes 11a, resulting in a network highly robust. Further, a wireless "hot spot" in a conventional wireless local area network (WLAN) can be extended into a wireless "hot area" covering a large area, and the leaf nodes 11b are distributed to a plurality of non-leaf nodes 11a. This way, the computational burden on and the power consumption of each non-leaf node 11a are relatively low.

In some embodiments, regardless of whether a mesh network topology is formed among the one or more non-leaf nodes 11a, in the Bluetooth network 10, all of the non-leaf nodes 11a are configured with the same status and capability. Each non-leaf node 11a is configured to transmit Bluetooth advertising data, and receive Bluetooth advertising data from other non-leaf nodes 11a or leaf nodes 11b, as well as forward (e.g., advertise to forward) received Bluetooth advertising data not destined for itself. In addition to the above-described capability, the non-leaf node 11a is further configured with the following capabilities. In one example, a non-leaf node 11a is configured to perform provisioning on an unprovisioned node requesting to join the Bluetooth mesh network. After the provisioning, the unprovisioned node is configured to successfully connect to the Bluetooth mesh network 10 to become a slave node of the Bluetooth mesh network 10. In another example, a non-leaf node 11a also is configured to select, from the at least one leaf node 11b and based on requirements, a slave node capable of becoming a non-leaf node, and notify the selected slave node to be configured as a non-leaf node. In some embodiments of the disclosure, a difference between the leaf node and the non-leaf node lies in whether the node is configured with the forwarding capability. The leaf node capable of becoming a non-leaf node comprises a node configured with the forwarding capability that is not activated. Correspondingly, the configuring, by the leaf node based on a notification, itself to be a non-leaf node is implemented by activating its forwarding capability based on the notification.

For the above-described exemplary embodiments, the implementation for a non-leaf node 11a to perform provisioning on an unprovisioned node; and to select, from leaf nodes, a leaf node capable of becoming a non-leaf node, is substantially similar to the following-described implementation for a leader node to provision an unprovisioned node; and to select, from slave nodes, a slave node capable of becoming a master node. Details are described below with exemplary embodiments.

In some embodiments, regardless of whether a mesh network topology is formed among the one or more non-leaf nodes 11a, in the Bluetooth network 10, the one or more non-leaf nodes 11a are divided into leader nodes and master nodes. As shown in FIG. 1, a hexagon represents a leader node, and a square represents a master node. Although illustrated as a plurality of nodes, the number of leader nodes and the number of master nodes can be one or any number. Based on the concept of the master node, the one or more leaf nodes 11b are referred to as slave nodes. In some embodiments, a slave node is configured to connect to a master node, and/or connect to a leader node.

In this example, the master node is configured to transmit Bluetooth advertising data, to receive Bluetooth advertising data from other master nodes or slave nodes, as well as to forward received Bluetooth advertising data not destined for itself. Similarly, the leader node is configured to transmit Bluetooth advertising data, receive Bluetooth advertising data from master nodes or slave nodes, as well as forward received Bluetooth advertising data not destined for itself. Further, the leader node serves as a management and control node in the Bluetooth network 10, performing various management operations on the Bluetooth network 10. For example, the leader node is configured to perform the following operations on the Bluetooth network 10: (1) selecting a master node from the slave nodes, and (2) performing provisioning on an unprovisioned node requesting to join the network. After the provisioning, the unprovisioned node becomes a slave node in the Bluetooth network 10.

Selecting a Master Node from the Slave Nodes

In some embodiments, in the Bluetooth network 10, the slave node is configured to detect whether an available master node exists in its vicinity. For example, for all of N pieces of Bluetooth advertising data consecutively transmitted by the slave node, if no acknowledgment message returned by a master node is received, it is determined that no available master node exists node in the vicinity. If an acknowledgment message returned by one or more master nodes is received, it is determined that an available master node exists nearby. In the previous example, N is a positive and is not limited herein, and can be flexibly configured based on requirements. In some embodiments, the consecutively transmitted N pieces of Bluetooth advertising data include one or both of service data and heartbeat data dedicated to detecting whether a master node is online. Taking the heartbeat data as an example, the slave node is configured to periodically transmit the heartbeat data to check whether a nearby master node is still in an online and available state. If no response (e.g., an ACK message) to any of the consecutively transmitted N pieces of heartbeat data is received, it is determined that no available master node exists nearby. Otherwise, it is determined that an available master node exists nearby.

If no available master node exists near the slave node, Bluetooth advertising data transmitted by the slave node cannot be forwarded. Thus, the slave node cannot communicate with other slave nodes, master nodes, or leader nodes beyond the slave node's signal coverage. Therefore, if no available master node exists nearby, the slave node is configured to transmit a request for searching for a master node. In one embodiment, the request for searching for a master node is a type of Bluetooth advertising data. Other slave nodes within the signal coverage of the slave node searching for a master node, in turn, receive the request advertised by the slave node searching for a master node. Upon receiving a request transmitted by the slave node for searching for a master node, a slave node is configured to determine whether its hardware capability meets the requirements of becoming a master node. If so, the slave node serves as a candidate slave node, and transmits a request for becoming a master node. Otherwise, the received request for searching for a master node is discarded. If the candidate slave node transmitting the request for becoming a master node is within the signal coverage of a leader node, the request transmitted by the candidate slave node for becoming a master node directly reaches the leader node. If the candidate slave node transmitting the request for becoming a master node is outside the signal coverage of the leader node, the request transmitted by the candidate slave node for becoming a master node is forwarded by one or more master nodes to reach the leader node. Hardware capabilities of the candidate slave node includes, but is not limited to: central processing unit (CPU) computing power, ROM storage capacity, and the like.

In some embodiments, one or more candidate slave nodes transmit the requests for becoming a master node. As such, the leader node receives the requests transmitted by the one or more candidate slave nodes to become a master node. Upon receiving a request transmitted by at least one candidate slave node for becoming a master node, the leader node selects, from the at least one candidate slave node, a target slave node capable of becoming a master node, and notifies the target slave node to be configured as a master node. The at least one candidate slave node is part of or all of the at least one slave node. Accordingly, the target slave node is one or more of the at least one candidate slave node. In one embodiment, the leader node also is configured to notify the at least one candidate slave node, except for the target slave node, that the at least one candidate slave node itself has not been selected as the master node. No matter what the notification is used, a slave node within the signal coverage of the leader node is configured to directly receive a notification from the leader node. For a slave node outside the signal coverage of the leader node, the notification transmitted by the leader node is forwarded to the slave node by one or more of the master nodes. A target slave node having received the notification configures itself to become a master node. In one example, this configuration is implemented by activating the forwarding capability of the target slave node such that to, when receiving Bluetooth advertising data not destined at itself (the master node newly configured), forward the Bluetooth advertising data.

According to various embodiments of the disclosure, any method is applicable for a leader node to select a target slave node from at least one candidate slave node, without limitation. For example, the following illustrates four exemplary selection methods.

Selection method 1: a target slave node capable of becoming a master node is selected from the at least one candidate slave node based on the online time duration associated with the at least one candidate slave node. In one embodiment, the request transmitted by the candidate slave node for becoming a master node includes the online time duration of the candidate slave node. In other embodiments, the leader node records the online time duration of each slave node and acquires the online time duration of each candidate slave node from the recorded online time durations of all of the slave nodes. In some embodiments, the online time duration refers to a time period during which a candidate slave node stays in a powered-on state. In one example, a candidate slave node having the longest online time duration is selected as the target slave node. In another example, a candidate slave node of which online time duration is within a configured time range is selected as the target slave node.

Selection method 2: a target slave node capable of becoming a master node is selected from the at least one candidate slave node based on the signal strength of the at least one candidate slave node. The leader node analyzes a received signal strength indicator (RSSI) of a received request transmitted by the at least one candidate slave node for becoming a master node and uses the RSSI as the signal strength of the at least one candidate slave node. In one example, a candidate slave node having the highest signal strength is selected as the target slave node. In another example, a candidate slave node having a signal strength within a configured signal strength range is selected as the target slave node.

Selection method 3: a target slave node capable of becoming a master node is randomly selected from the at least one candidate slave node. In one example, the leader node uses a random function or a hash function to randomly select a target slave node from the at least one candidate slave node. This method results in relatively high efficiency in selecting a target slave node.

Selection method 4: a target slave node capable of becoming a master node is selected from the at least one candidate slave node based on hardware capabilities of the at least one candidate slave node. In some embodiments, the request transmitted by the candidate slave node for becoming a master node includes the hardware capabilities of the candidate slave node. In some embodiments, the leader node maintains the hardware capabilities of each slave node, and acquires the hardware capabilities of each candidate slave node from the maintained hardware capabilities of all of the slave nodes. In one example, a candidate slave node having the highest hardware capabilities is selected as the target slave node. In another example, a candidate slave node having hardware capabilities within a certain capability range is selected as the target slave node.

According to various embodiments, the leader node can select the candidate slave node using one of the above-described selection methods, or a combination of two or more of the above-described selection methods.

In some embodiments, the leader node is configured to reselect a master node based on the request of the slave node such that the Bluetooth network is configured with a fault tolerance mechanism, which enables a substitute node to be quickly found when a master node is no longer available, thereby ensuring network stability.

Provisioning an Unprovisioned Node Requesting to Join the Network

In the Bluetooth network 10, the leader node is also configured to provision an unprovisioned node requesting to join the network. In some embodiments, a provisioning operation includes: acquiring, by a leader node and in response to a provisioning instruction, a network access request from an unprovisioned node, where the network access request includes an identifier of the unprovisioned node; acquiring provisioning data for the unprovisioned node based on the identifier of the unprovisioned node; and advertising the provisioning data to the unprovisioned node based the identifier of the unprovisioned node such that the unprovisioned node performs the provisioning.

According to various embodiments, a provisioning instruction can be transmitted to the leader node in various manners. In one example, the leader node is configured with the voice recognition capability, and a user sends a voice instruction of provisioning to the leader node. The leader node receives the voice instruction sent by the user and recognizes the request of provisioning. The leader node then initiates a provisioning process. In another example, the leader node supports interactions with another user terminal, and the user transmits a provisioning instruction to the leader node via the user terminal. After receiving the provisioning instruction, the leader node initiates a provisioning process. In yet another example, the leader node is provided with an electronic screen, and the user interacts with the leader node via the electronic screen. This way, the user inputs a provisioning instruction to the leader node via the electronic screen. After receiving the provisioning instruction, the leader node initiates a provisioning process.

In this example, the unprovisioned node refers to a Bluetooth device that is requesting to join the Bluetooth network 10 but has not yet joined the Bluetooth network 10. After the unprovisioned node is powered on, the unprovisioned node periodically advertises a network access request. In some embodiments, the network access request includes the identifier of the unprovisioned node. The network access request is a type of Bluetooth advertising data, having a destination address as an advertising address. The identifier of the unprovisioned node can include any information capable of uniquely identifying the unprovisioned node. For example, the identifier of the unprovisioned node is a media access control (MAC) address, a device identification code, and the like, associated with the unprovisioned node.

In some embodiments, the unprovisioned node is also configured to advertise a network access request based on a user configuration to request to join the Bluetooth network 10. For example, if the unprovisioned node is configured with the voice recognition capability, the user vocally pre-configures one or more criteria of a time, a condition, a trigger event, etc. for connecting the unprovisioned node to the Bluetooth network 10. As such, when the user-configured time is reached, or when the user-configured condition is met, or when the user-configured trigger event occurs, the unprovisioned node advertises a network access request to join the Bluetooth network 10. In some embodiments, if the unprovisioned node is provided with a touch panel or an electronic screen, the user also pre-configures, via the touch panel or the electronic screen, one or more criteria of a time, a condition, a trigger event, etc. for connecting the unprovisioned node to the Bluetooth network 10. In one example, for a movable unprovisioned node (e.g., an air purifier or a floor cleaning robot), the user pre-configures the unprovisioned node to request, when arriving at an operating region (e.g., a master bedroom), to join the Bluetooth network 10. This way, the user can send a control instruction to the unprovisioned node via a mobile phone. In this example, the unprovisioned node checks its position during the movement, and upon determining that it has moved to the operating region, it advertises a network access request to request to join the Bluetooth network 10. Next, the user sends, via a Bluetooth-enabled mobile phone, various control instructions to the unprovisioned node for operations such as powering up, configuring an operating mode, configuring an operating time, etc.

In some embodiments, the unprovisioned node also is configured to advertise a network access request when in need to join the network to request to join the Bluetooth network 10. In one example where the unprovisioned node is a temperature/humidity sensor capable of measuring temperature/humidity data in an environment, when it is detected that temperature/humidity data is abnormal (e.g., the temperature/humidity data is greater than a configured upper limit, or is less than a configured lower limit), the unprovisioned node advertises a network access request to join the Bluetooth network 10, and transmits the abnormal temperature/humidity data to a related monitoring device via the Bluetooth network 10. In some embodiments, the monitoring device is a master node or a leader node in the Bluetooth network 10. In other embodiments, the monitoring device is a device located outside the Bluetooth network 10 but communicatively connected to a master node or a leader node in the Bluetooth network 10.

In some embodiments, the leader node scans, in response to the networking instruction, within its signal coverage, for a network access request advertised by an unprovisioned node. When the leader node identifies a network access request by scanning within its signal coverage, the leader node acquires an identifier of the unprovisioned node from the network access request. Based on the identifier of the unprovisioned node, the lead node acquires provisioning data for the unprovisioned node. Next, the leader node transmits, in an advertising manner, the provisioning data for the unprovisioned node to the unprovisioned node. When the leader node does not find any network access request from an unprovisioned node by scanning within its signal coverage, the leader node advertises a relay instruction to instruct a master node within its signal coverage to activate the relay capability. The master node is configured to activate the relay capability upon receiving the relay instruction, and forward received network access requests to the leader node via the relay capability. In some embodiments, the forwarding, by the master node, received network access requests to the leader node via the relay capability includes: replacing a destination address of a network access request from an advertisement address to an address of the leader node, and transmitting the network access request having the replaced destination address.

Because the unprovisioned node has not joined the Bluetooth network 10, before the master node activates the relay capability, the master node does not forward any received network access request as it does for Bluetooth advertising data received from a slave node, other master nodes, or a leader node. The forwarding capability of the master node mainly serves a node having joined the Bluetooth network 10 successfully. However, after activating the relay capability, the master node forwards a received network access request to the leader node via the relay capability, which is referred to as relaying to forward or relaying.

In turn, the leader node is configured to receive a network access request relayed by and received at the master node within the leader node's signal coverage, the network access request advertised by an unprovisioned device. The leader node is configured to acquire the identifier of the unprovisioned node from the network access request; to acquire the provisioning data for the unprovisioned node based on the identifier of the unprovisioned node; and to transmit, in an advertising manner, the provisioning data for the unprovisioned node to the unprovisioned node.

In some embodiments, the leader node is configured to package the provisioning data and the identifier of the unprovisioned node in a network access response, and advertise the network access response such that the master node within the leader node's signal coverage forwards the network access response to the unprovisioned device, which performs the provisioning operations. The master node with the activated relay capability is further configured to advertise to forward the network access request when receiving a network access response such that a corresponding unprovisioned node receives and acquires the provisioning data therein.

In some embodiments, before returning the provisioning data to the unprovisioned node, the leader node is also configured to perform identity verification or permission verification on the unprovisioned node. After the unprovisioned node passes the identity verification or the permission verification, the leader node returns the provisioning data to the unprovisioned node, the provisioning data being used to connect the unprovisioned node to the Bluetooth network 10. This way, the security of the Bluetooth network 10 is ensured. In some embodiments, the leader node is configured to maintain identifiers associated with authenticated nodes or nodes with authorized access permission in advance, and match the identifier of the unprovisioned node with the maintained identifiers of the authenticated nodes or nodes with authorized access permissions. If the identifier of the unprovisioned node matches one of the identifiers of the authenticated nodes or nodes with authorized access permission, it is determined that the non-provision node passes the identity verification or the permission verification. In some embodiments, the leader node is also configured to transmit the identifier of the unprovisioned node to a terminal device registered by a network administrator. This way, the network administrator determines whether the unprovisioned node is allowed to be connected to the Bluetooth network. If an acknowledgment instruction returned by the network administrator via the terminal device is received, t is determined that the unprovisioned node passes the identity verification or the permission verification.

An unprovisioned node is configured to receive the network access response advertised and forwarded by the master node, and determine whether the identifier of the unprovisioned node included in the network access response is the same as its own identifier. If so, the network access response is received, and provision is performed based on the provisioning data in the network access request. Otherwise, the network access response is discarded.

In some embodiments, as an identifier of an unprovisioned node is included in both the network access request and the network access response, different unprovisioned nodes can be distinguished from each other. As such, unprovisioned nodes are allowed to initiate network access operation at the same time, or in the same time period, thereby improving network access efficiency.

In some embodiments, the leader node is configured with the capability of generating provisioning data. In one example, the leader node is configured to generate provisioning data for an unprovisioned node directly based on an identifier of the unprovisioned node and to transmit the generated provisioning data to the unprovisioned node.

In other embodiments, the leader node is configured to cooperate with a server to complete the provisioning of the unprovisioned node. The server is responsible for generating provisioning data for each unprovisioned node. The leader node serves as a facilitating device for provisioning, responsible for receiving a network access request, reporting the received network access request to the server, and forwarding to an unprovisioned node provisioning data returned by the server.

Figure 2:
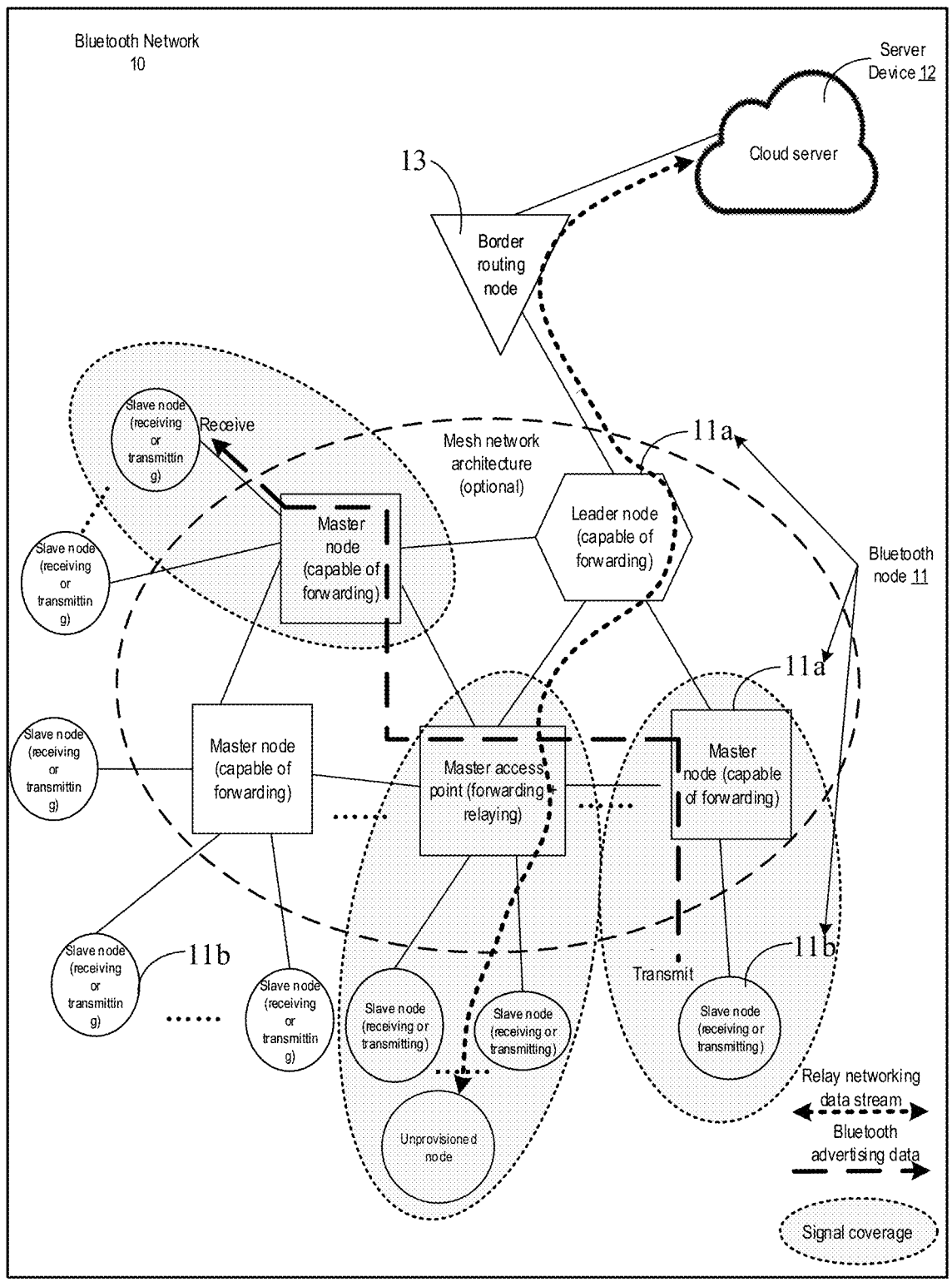
FIG. 2 is a block diagram illustrating a Bluetooth network according to some embodiments of the disclosure.

FIG. 2 is a block diagram illustrating a Bluetooth network according to some embodiments of the disclosure. As shown herein FIG. 2, the Bluetooth network 10 includes, in addition to the one or more non-leaf nodes 11a and the one or more leaf nodes 11b, a server 12. The server 12 may be any computing device configured with sufficient processing capabilities. For example, the server 12 is a client device such as a smartphone, a personal computer, a wearable device, a conventional server, a cloud server, a server array, and the like. In FIG. 2, a cloud server is depicted as an example to illustrate the server 12.

In one embodiment, to provision, the leader node is configured to transmit the identifier of the unprovisioned node to the server 12 and to receive provisioning data for the unprovisioned device returned by the server 12. The server 12 is configured to receive the identifier of the unprovisioned node transmitted by the leader node, generating provisioning data for the unprovisioned node, and returning the provisioning data to the leader node.

In some embodiments, and as shown in FIG. 2, the Bluetooth network 10 further includes a border routing node 13, which is illustrated as a triangle in FIG. 2. The border routing node 13, connected between the leader node and the server 12, bridges the Bluetooth network 10 and a device in a public network (e.g., the server 12). The border routing node 13 is configured to forward communication data between the leader node 11a and the server 12. In some embodiments, the border routing node 13 is a smart speaker, a smartphone, an access point (AP), a router, a home network gateway, and the like.

According to various embodiments the server 12 is configured to generate provisioning data for the unprovisioned node in any suitable manner.

Figure 3A:
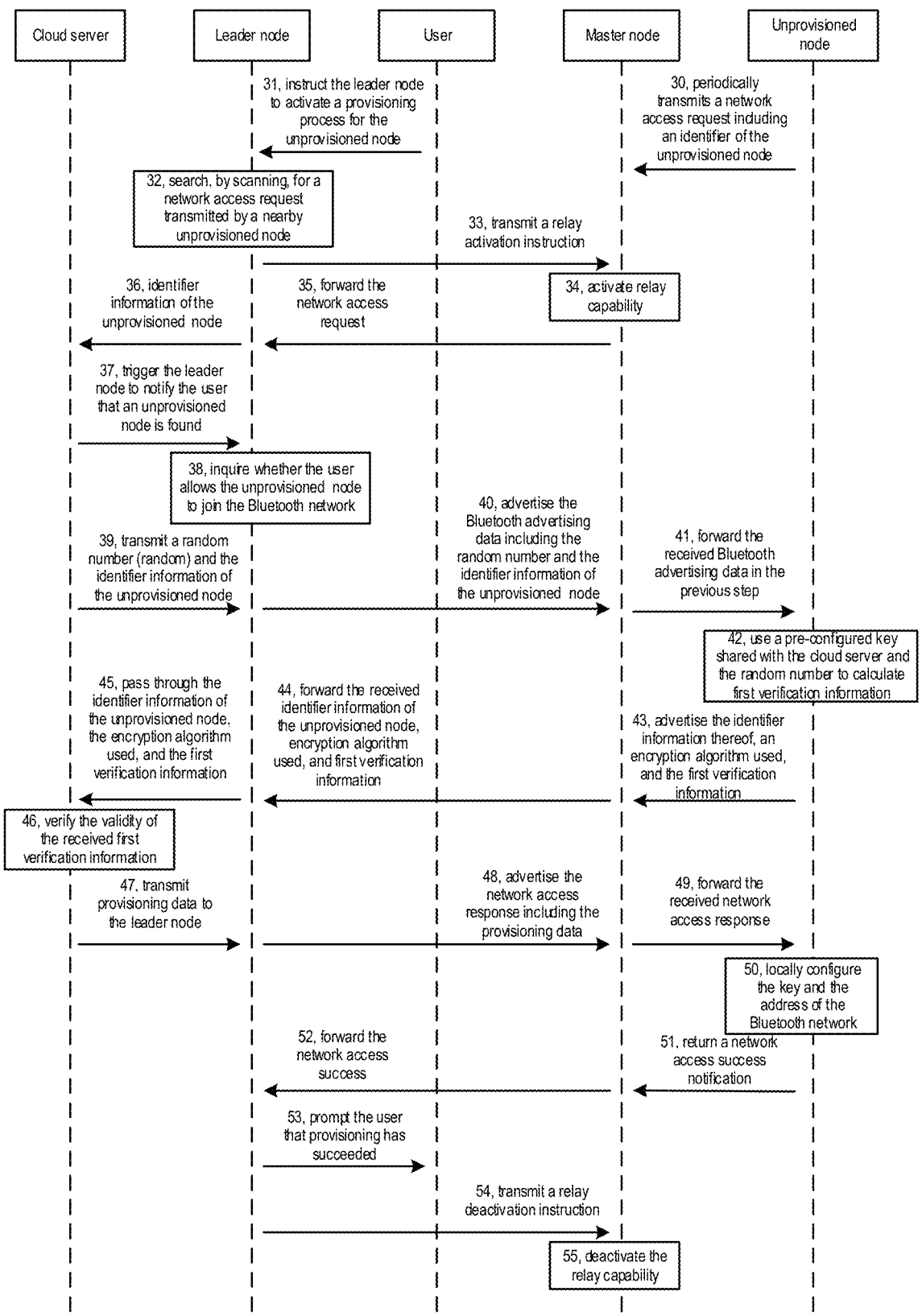
FIG. 3A is a flow diagram illustrating a method for provisioning a node according to some embodiments of the disclosure.

FIG. 3A is a flow diagram illustrating a process for a leader node and a server cooperating with each other to provision an unprovisioned node according to some embodiments of the disclosure.

Some steps/processes described herein or depicted in the drawings include a plurality of operations in a specific sequence. However, these operations may not be performed in the specific sequence depicted or may be performed in parallel. Further, some of these operations may not be performed. The operations only serve as illustrating examples, not intended as a limitation in any manner. In some embodiments, as shown in FIG. 3A, the process includes the following steps.

Step 30: after an unprovisioned node (e.g., a Bluetooth refrigerator) is powered on, the unprovisioned node periodically transmits a network access request, the network access request including identifier information of the unprovisioned node.

Step 31: a user vocally inputs an instruction to a leader node (e.g., a smart speaker) to instruct the leader node to activate a provisioning process for the unprovisioned node.

Step 32: the leader node searches, by scanning, for a network access request transmitted by an unprovisioned node in the vicinity.

Step 33: if no network access request transmitted by any unprovisioned node is found by scanning, the leader node transmits a relay activation instruction to a master node in a Bluetooth network.

Step 34: the master node that has received the relay activation instruction activates its relay capability such that the master node forwards, by default, all data used in the provisioning process (e.g., the network access request and a network access response).

Step 35: a master node, in the vicinity of the unprovisioned node and capable of receiving a network access request, is configured to forward the network access request such that the leader node receives the network access request forwarded by the master node.

Step 36: the leader node obtains (e.g., by parsing the request) the identifier information of the unprovisioned node from the network access request, transmits the identifier information of the unprovisioned node to a cloud server via a public network, and notifies the cloud server that an unprovisioned node requests to join the Bluetooth network.

Step 37: the cloud server triggers the leader node to notify the user that an unprovisioned node is found and acquire a confirmation from the user regarding whether to allow the unprovisioned node to join the Bluetooth network.

Step 38: the leader node inquires whether the user allows the unprovisioned node to join the Bluetooth network. In one example, the leader node is configured to announce in voice that "an ABC device has been found for you, do you allow the device to be connected to the Bluetooth network?"

Step 39: if the user allows the unprovisioned node to join the Bluetooth network, for the unprovisioned node, the cloud server transmits to the leader node a random number and the identifier information for the unprovisioned node via the public network.

Step 40: the leader node constructs Bluetooth advertising data including the random number and the identifier information of the unprovisioned node, and advertises the Bluetooth advertising data including the random number and the identifier information of the unprovisioned node.

Step 41: if the Bluetooth advertising data in the previous step is received, the master node forwards the Bluetooth advertising data received in the previous step.

Step 42: after receiving the Bluetooth advertising data destined for unprovisioned node itself the unprovisioned node uses a pre-configured key shared with the cloud server and the random number to calculate first verification information.

The unprovisioned node first determines, based on the identifier information of the unprovisioned node, whether the received Bluetooth advertising data is destined for itself; and if so, uses the shared key and the random number (Random) to calculate the first verification information (Verification).

Step 43: the unprovisioned node advertises its identifier information, an encryption algorithm used, and the first verification information.

Step 44: if the master node receives the identifier information of the unprovisioned node, the encryption algorithm used, and the first verification information, the master node forwards the received identifier information of the unprovisioned node, encryption algorithm used, and first verification information.

Step 45: after receiving the identifier information of the unprovisioned node, encryption algorithm used, and first verification information, the leader node passes through the identifier information of the unprovisioned node, the encryption algorithm used, and the first verification information to the cloud server via the public network.

Step 46: the cloud server verifies the validity of the received first verification information. In some embodiments the cloud server uses the above-described random number to locally calculate second verification information using the pre-configured key shared with the unprovisioned node, and compares the second verification information with the received first verification information. If the second verification information is the same as the first verification information, the verification is successful.

Step 47: if the verification succeeds, the cloud server transmits provisioning data to the leader node via the public network, the provisioning data including the identifier information of the unprovisioned node, a key of the Bluetooth network, and a Bluetooth network address.

Step 48: the leader node constructs Bluetooth advertising data, e.g., a network access response including the networking data, and advertises the network access response including the networking data.

Step 49: if the master node receives the above-described network access response, the master node forwards the received network access response.

Step 50: after receiving the network access response, the unprovisioned node obtains (e.g., by parsing the response) the provisioning data from the network access response, and locally provisions the key and the address of the Bluetooth network.

Step 51: after completing the provisioning, the unprovisioned node returns a network access success notification to the leader node.

Step 52: after receiving the network access success notification, the master node forwards the network access success notification.

Step 53: after receiving the network access success notification, the leader node notifies the user that the unprovisioned node has successfully joined the network. In one example, a voice message of "provisioning has succeeded" is output via voice announcement.

Step 54: the leader node transmits a relay deactivation instruction to the master node in the Bluetooth network to instruct the master node to deactivate its relay capability.

Step 55: after receiving the relay deactivation instruction, the master node deactivates the relay capability such that the master node no longer forwards data used in the provisioning process.

According to various embodiments, leveraging the relay capability of the master node, provisioning is performed on the unprovisioned node in a relaying manner. This way, an unprovisioned node in a farther position is enabled to join the Bluetooth network, thereby extending coverage of the Bluetooth network. Further, because the identifier information of the unprovisioned node is added during the provisioning process, networking data of different unprovisioned nodes is distinguished from each other, and networking operation can be simultaneously performed on a plurality of unprovisioned nodes (e.g., networking operations can be performed in batches), thereby improving network efficiency.

Embodiments of the disclosure provide Bluetooth networks applicable to a variety of scenarios, such as Internet of Things (IoT) communication in a smart home scenario, a smart building scenario, a shopping mall scenario, in-vehicle scenarios, scenarios in which an in-vehicle scenario is combined with a smart home scenario, and the like.

Figure 3B:
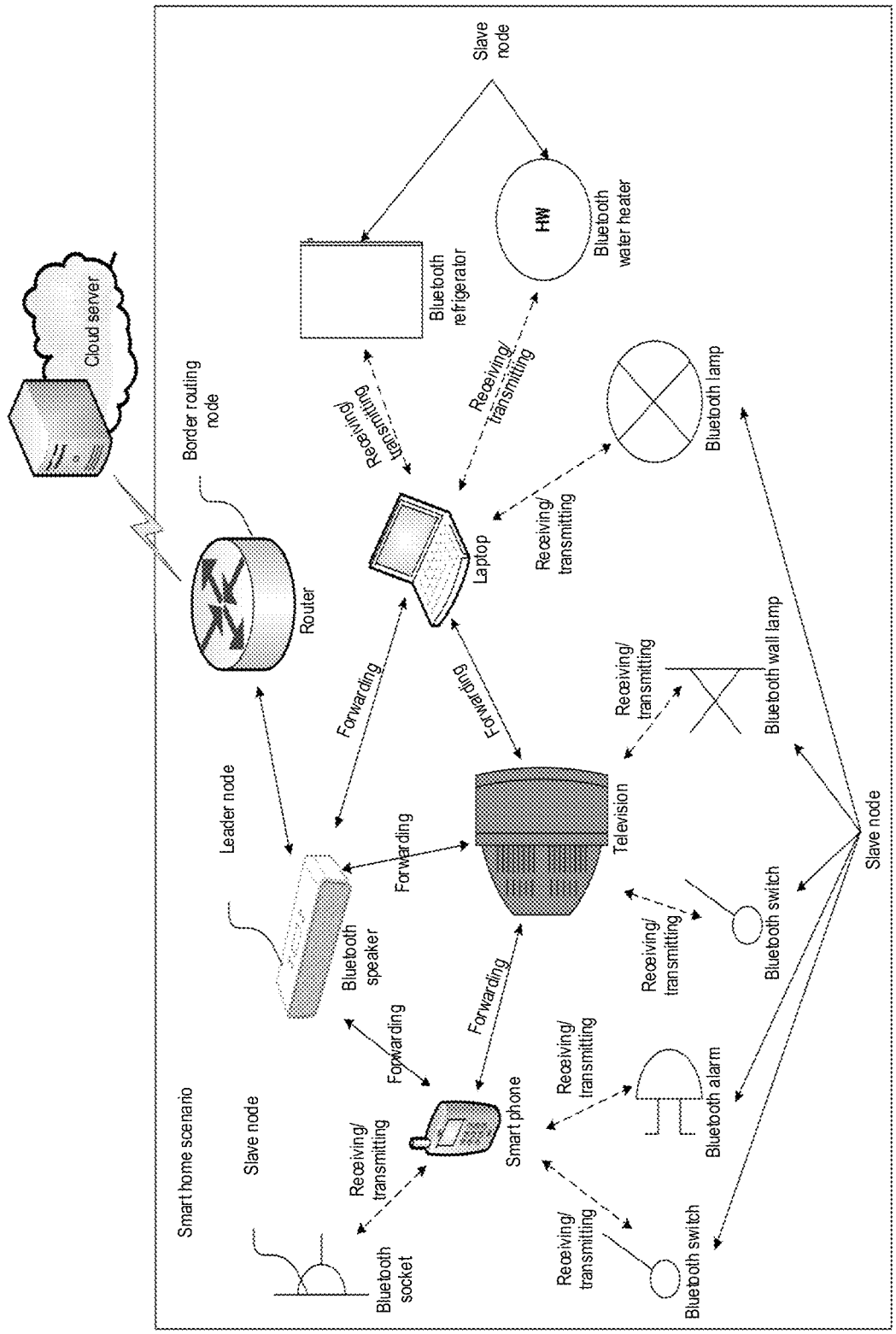
FIG. 3B is a block diagram illustrating a Bluetooth network in a smart home scenario according to some embodiments of the disclosure.

FIG. 3B is a block diagram illustrating a Bluetooth network in a smart home scenario, according to some embodiments of the disclosure. As shown in FIG. 3B, a smart home Bluetooth network includes, in a home environment, a smart speaker supporting the Bluetooth Mesh Profile and serving as a leader node; and a television, a smartphone, and a laptop supporting the Bluetooth Mesh Profile and serving as master nodes. Also in the smart home network, other devices configured with Bluetooth advertisement capability such as a Bluetooth switch, a Bluetooth wall lamp, a Bluetooth lamp, a Bluetooth alarm, a Bluetooth socket, a Bluetooth alarm, a Bluetooth refrigerator, etc. serve as slave nodes; and a router serves as a border routing node to establish a communication connection to a cloud server. In this example, the Bluetooth switch, the Bluetooth lamp, a Bluetooth air conditioner, or the Bluetooth refrigerator in the smart home network needs to transmit a network access request and successfully perform provisioning to become a slave node.

In any application scenario, the slave node, the master node, and the leader node in the Bluetooth network may malfunction or undergo a power failure, resulting in disconnection. According to various embodiments of the disclosure, in the Bluetooth network, the master node and the leader node are configured to sense an online status of slave nodes connected thereto. Upon sensing that a slave node is disconnected, the master node and the leader node performs disconnection management on the disconnected slave node. Further, the master node is also configured to sense an online status of a leader node, or another master node connected thereto. Upon sensing that the leader node or another master node is disconnected, the master node is also configured to perform disconnection management on the disconnected leader node or the disconnected another master node. Similarly, in addition to sensing the online status of the slave nodes connected thereto, the leader node is also configured to sense an online status of master nodes connected thereto. Upon sensing that a master node is disconnected, the leader node is also configured to perform disconnection management on the disconnected master node.

In some embodiments, when performing disconnection management on a disconnected node, both the leader node and the master node are configured to transmit prompt information. This way, a network administrator or network maintenance staff can troubleshoot the disconnected node. In some embodiments, investigations are conducted to identify the factors causing the disconnection of the disconnected node. When it is determined that the disconnection is caused by a power failure, power-on control is performed on the disconnected node. In some embodiments, when necessary, the leader node or the master node also is configured to transfer a task of the node undergoing a power failure to another node in the vicinity or transfer the task to the leader node or the master node itself. In one example, if the master node detects that another master node in the vicinity is disconnected, the master node increases its own transmission power to extend its signal coverage such as to take over (e.g., taking over tasks running on) part or all of the slave nodes connected to the disconnected master node. Similarly, if the master node or the leader node detects that a slave node is disconnected, the master node or the leader node controls one or more nearby slave nodes to increase their transmission power to extend the signal coverage such as to achieve a best possible coverage for the region originally covered by the faulty slave node. This way, adverse impacts on tasks implemented on the Bluetooth network caused by the disconnection of nodes are reduced as much as possible.

According to various embodiments, in the Bluetooth network, a slave node communicates with other remote slave node via a master node or a leader node. Further, a slave node is controlled by the master node or the leader node, to which the slave node connects, to performs the corresponding operation based on the control of the master node or the leader node. In one example, the master node or the leader node groups slave nodes within their respective signal coverage and performs different control on slave nodes in the unit of groups. Taking sensor slave nodes as an example, the master node or the leader node divides the sensors in their respective signal coverage into different groups based on time attributes or position attributes and controls the sensors in different groups to operate in different time periods or in different modes. In another example, during a business trip, the user adds his/her Bluetooth mobile phone or a Bluetooth watch to a Bluetooth network of a hotel, and transmits a time adjustment request to a hotel server (e.g., a master node or a leader node) to reset the time of the Bluetooth mobile phone or the Bluetooth watch (e.g., a slave node) by the hotel server. As such, synchronization to the local time is achieved. In the smart home scenario, the user controls, via a Bluetooth mobile phone (e.g., a master node or a leader node) the operations such as turning on, turning off, and the like of a floor cleaning robot and an air purifier connected thereto the Bluetooth mobile phone.

In some embodiments, the leader node also is also configured to perform various controls on a master node connected to the leader node. For example, in a smart home scenario, the Bluetooth speaker serving as a leader node controls master nodes (e.g., a Bluetooth mobile phone and a Bluetooth television) based on a control instruction of the user. In one example, the Bluetooth speaker controls the turning on of the Bluetooth mobile phone, activation of its Bluetooth capability of the Bluetooth mobile phone, and so on, as well as the turning on, channel switching, volume adjustment, and so of the Bluetooth television. The user can vocally send a control instruction to the Bluetooth speaker, the control instruction, including the information regarding both a control target and a control command. For example, the user sends a voice signal of "please turn on the television" to the Bluetooth speaker. After receiving the voice signal, the Bluetooth speaker determines (e.g., by recognizing and parsing the voice signal) the control target as the television and the control command as to turn on the television. In turn, the Bluetooth speaker transmits to the television a Bluetooth signal for turning on the television. After receiving the Bluetooth signal instructing the television to turn on, the television performs a turning-on operation.

Figure 4A:
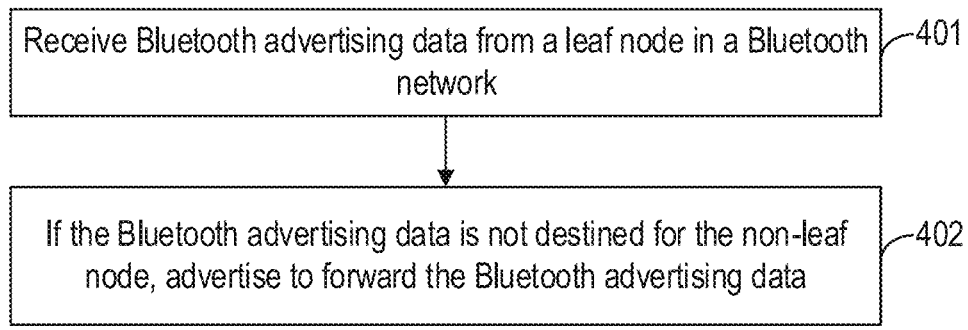
FIG. 4A is a flow diagram illustrating a Bluetooth network communication method according to some embodiments of the disclosure.

FIG. 4A is a schematic flow diagram illustrating a communication method for a Bluetooth network according to some embodiments of the disclosure. This communication method is described from the perspective of a non-leaf node in the Bluetooth network. In some embodiments, as shown in FIG. 4A, the communication method includes the following steps.

Step 401: receive Bluetooth advertising data from a leaf node in a Bluetooth network.

Step 402: if the Bluetooth advertising data is not destined for the non-leaf node, advertise to forward the Bluetooth advertising data.

In one embodiment, the Bluetooth network includes a plurality of Bluetooth nodes. The Bluetooth node refers to a Bluetooth device supporting a Bluetooth communication standard. For example, the Bluetooth node is, but is not limited to, a Bluetooth mobile phone, a Bluetooth headset, a Bluetooth speaker, a Bluetooth switch, a Bluetooth television, a Bluetooth lamp, a Bluetooth bracelet, etc. The Bluetooth communication standard has a plurality of versions, such as Bluetooth 1.0, Bluetooth 2.0, Bluetooth 3.0, Bluetooth 4.0, etc. Any version of the Bluetooth communication standards can be supported by the Bluetooth node; that is, the plurality of Bluetooth nodes support a Bluetooth communication standard of the same version or multiple Bluetooth communication standards of different versions.

In the Bluetooth network, the plurality of Bluetooth nodes includes one or more non-leaf nodes and one or more leaf nodes. The one or more non-leaf nodes are capable of being communicatively connected to each other, and each of the one or more leaf nodes is capable of being communicatively connected to at least one of the one or more non-leaf nodes. The communication connection herein mainly refers to a Bluetooth connection. An exemplary structure of the Bluetooth network is shown in FIG. 1, in which each leaf node is communicatively connected to one non-leaf node. For a leaf node, if the leaf node is capable of being communicatively connected to a non-leaf node, the leaf node is within the signal coverage of the non-leaf node.

In some embodiments, one or more non-leaf nodes are configured with the forwarding capability so as to forward Bluetooth advertising data from other nodes. Each non-leaf node is communicatively connected to a plurality of other nodes (including a leaf node and/or a non-leaf node) such that the plurality of other nodes is interconnected. A Bluetooth communication standard supported by the non-leaf node needs to support network interconnection and forwarding capabilities. In one example, the Bluetooth communication standard is a Bluetooth communication standard of a relatively high version, such as Bluetooth 4.0 and above. In some embodiments, the non-leaf node is also a Bluetooth device having relatively high computing power (e.g., a Bluetooth mobile phone, a Bluetooth television, a Bluetooth speaker, etc.)

In some embodiments, upon receiving Bluetooth advertising data from a leaf node, the non-leaf node determines, based on a destination address included in the received Bluetooth advertising data, whether the Bluetooth advertising data is destined for itself. If the destination address is not the same as the address of the non-leaf node, the non-leaf node determines that the data is not destined for itself; and advertises to forward the data. If the destination address is the same as the address of the non-leaf node, it is determined that the data is destined for the non-leaf node, and the non-leaf node accepts and processes the data.

In some embodiments, to prevent flooding in the Bluetooth network, a TTL mode is implemented. A threshold is pre-configured at the non-leaf node. As such, upon receiving Bluetooth advertising data, the non-leaf node determines whether a destination address of the Bluetooth advertising data is the same as its own address. If the destination address of the received Bluetooth advertising data is not the same as the address of the non-leaf node, it is determined that the Bluetooth advertising data is not destined for the non-leaf node; and the Bluetooth advertising data needs to be advertised. If Bluetooth advertising data not destined for the non-leaf node is received, a TTL value of the received Bluetooth advertising data is checked to determine whether the TTL value reaches the configured threshold. If the TTL value does not reach the configured threshold, the TTL value is increased by a configured step value, and the Bluetooth advertising data is advertised. If the TTL value reaches the configured threshold, the Bluetooth advertising data is discarded and not forwarded. The value of the pre-configured threshold and the value of the configured step can be any suitable number and can be flexibly configured based on application requirements. In one example, the configured step value is one (1). That is, the TTL value is increased by one (1) upon each forwarding.

In some embodiments, the non-leaf node stores Bluetooth advertising data that has been previously forwarded. In one example, the Bluetooth advertising data is cached locally. Upon receiving Bluetooth advertising data not destined for itself, the non-leaf node compares the received Bluetooth advertising data with the stored Bluetooth advertising data previously forwarded. If the received Bluetooth advertising data is not the same as the Bluetooth advertising data previously forwarded, the Bluetooth advertising data is advertised, and the Bluetooth advertising data is stored. If the received Bluetooth advertising data is the same as the Bluetooth advertising data previously forwarded, the Bluetooth advertising data is discarded and not advertised. The method for storing the Bluetooth advertising data in the non-leaf node is not limited to locally caching the Bluetooth advertising data. In one example, the Bluetooth advertising data is stored in local memory, hard disk, database, or the like.

In some embodiments, for any non-leaf node, the above-described data forwarding method employing the TTL value and the above-described data forwarding method employing the stored Bluetooth advertising data previously forwarded are used in an exclusive manner, or in combination. When the two data forwarding methods are used in combination, upon receiving Bluetooth advertising data not destined for the non-leaf node, the non-leaf node checks whether a TTL value of the received Bluetooth advertising data reaches the configured threshold, and compares the received Bluetooth advertising data with the recorded Bluetooth advertising data previously forwarded. If the TTL value of the received Bluetooth advertising data does not reach the configured threshold, and the Bluetooth advertising data is not the same as the Bluetooth advertising data previously forwarded, the Bluetooth advertising data is advertised. If the TTL value of the received Bluetooth advertising data reaches the configured threshold, or if the Bluetooth advertising data is the same as the Bluetooth advertising data previously forwarded, the Bluetooth advertising data is discarded.

Figure 4B:
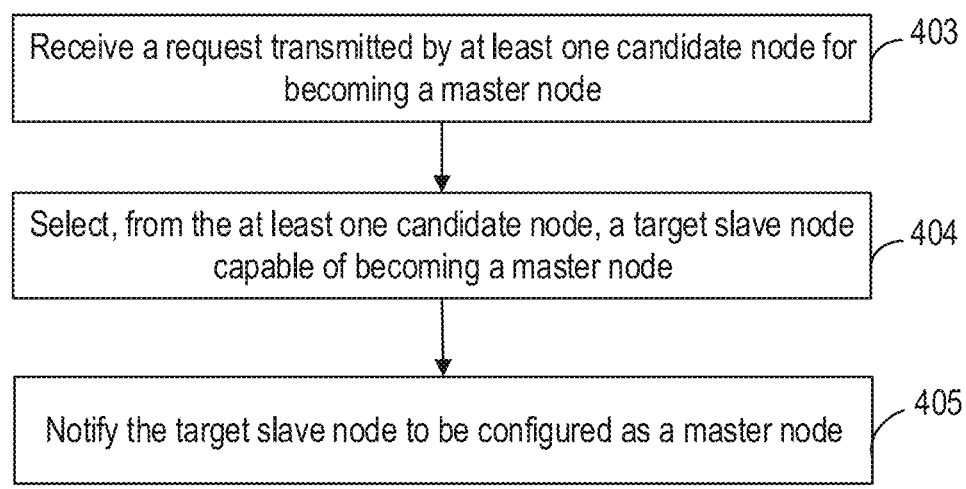
FIG. 4B is a flow diagram illustrating a method for selecting a master node from slave nodes of a Bluetooth network according to some embodiments of the disclosure.

FIG. 4B is a flow diagram illustrating a method for selecting a master node from slave nodes in a Bluetooth network, according to some embodiments of the disclosure. The method is described from the perspective of a leader node, which is one of the non-leaf nodes. The method includes the following steps.

Step 403: receive a request transmitted by at least one candidate slave node for becoming a master node.

Step 404: select, from the at least one candidate slave node, a target slave node capable of becoming a master node.

Step 405, notify the target slave node to be configured as a master node.

In some embodiments, the slave node detects whether an available master node exists in its vicinity. If no available master node exists nearby the slave node, Bluetooth advertising data transmitted by the slave node cannot be forwarded, as a result of which the slave node cannot communicate with other slave nodes or master node, or other nodes beyond the signal coverage of the detecting slave node. Therefore, if no available master node exists nearby, the slave node serves as a candidate slave node and transmits a request for searching for a master node. In one example, one or more candidate slave nodes transmit requests for becoming a master node, and the leader node receives the requests transmitted by one or more candidate slave nodes for becoming a master node.

In some embodiments, upon receiving a request transmitted by at least one candidate slave node for becoming a master node, the leader node selects, from the at least one candidate slave node, a target slave node capable of becoming a master node, and notifies the target slave node to be configured as a master node. The at least one candidate slave node is part of or all the at least one slave node. As such, the target slave node is one or more of the at least one candidate slave node. In some embodiments, the leader node notifies the at least one candidate slave node, except for the target slave node, not of not being selected as the master node. No matter how the notification is implemented, a slave node within the signal coverage of the leader node directly receives the notification from the leader node. For a slave node outside the signal coverage of the leader node, the notification transmitted by the leader node is forwarded to the slave node by one or more master nodes. A target slave node, upon receiving the notification, configures itself to become a master node. This configuration operation mainly refers to activating its forwarding capability such that, when receiving Bluetooth advertising data not destined for itself node, the (newly configured) master node forwards the Bluetooth advertising data.

Any suitable techniques can be applied to a leader node selecting a target slave node from at least one candidate slave node, without limitation. The following illustrates four exemplary selection methods.

Selection method 1: a target slave node capable of becoming a master node is selected from the at least one candidate slave node based on the online time duration associated with the at least one candidate slave node. In one embodiment, the request transmitted by the candidate slave node for becoming a master node includes the online time duration of the candidate slave node. In other embodiments, the leader node records the online time duration of each slave node and acquires the online time duration of each candidate slave node from the recorded online time durations of all of the slave nodes. In some embodiments, the online time duration refers to a time period during which a candidate slave node stays in a powered-on state. In one example, a candidate slave node having the longest online time duration is selected as the target slave node. In another example, a candidate slave node of which online time duration is within a configured time range is selected as the target slave node.

Selection method 2: a target slave node capable of becoming a master node is selected from the at least one candidate slave node based on the signal strength of the at least one candidate slave node. The leader node analyzes a received signal strength indicator (RSSI) of a received request transmitted by the at least one candidate slave node for becoming a master node and uses the RSSI as the signal strength of the at least one candidate slave node. In one example, a candidate slave node having the highest signal strength is selected as the target slave node. In another example, a candidate slave node having a signal strength within a configured signal strength range is selected as the target slave node.

Selection method 3: a target slave node capable of becoming a master node is randomly selected from the at least one candidate slave node. In one example, the leader node uses a random function or a hash function to randomly select a target slave node from the at least one candidate slave node. This method results in relatively high efficiency in selecting a target slave node.

Selection method 4: a target slave node capable of becoming a master node is selected from the at least one candidate slave node based on hardware capabilities of the at least one candidate slave node. In some embodiments, the request transmitted by the candidate slave node for becoming a master node includes the hardware capabilities of the candidate slave node. In some embodiments, the leader node maintains (e.g., maintains a record of) the hardware capabilities of each slave node, and acquires the hardware capabilities of each candidate slave node from the maintained hardware capabilities of all of the slave nodes. In one example, a candidate slave node having the highest hardware capabilities is selected as the target slave node. In another example, a candidate slave node having hardware capabilities within a certain capability range is selected as the target slave node.

According to various embodiments, the leader node can select the candidate slave node using one of the above-described selection methods, or using a combinations of two or more of the above-described selection methods.

Figure 4C:
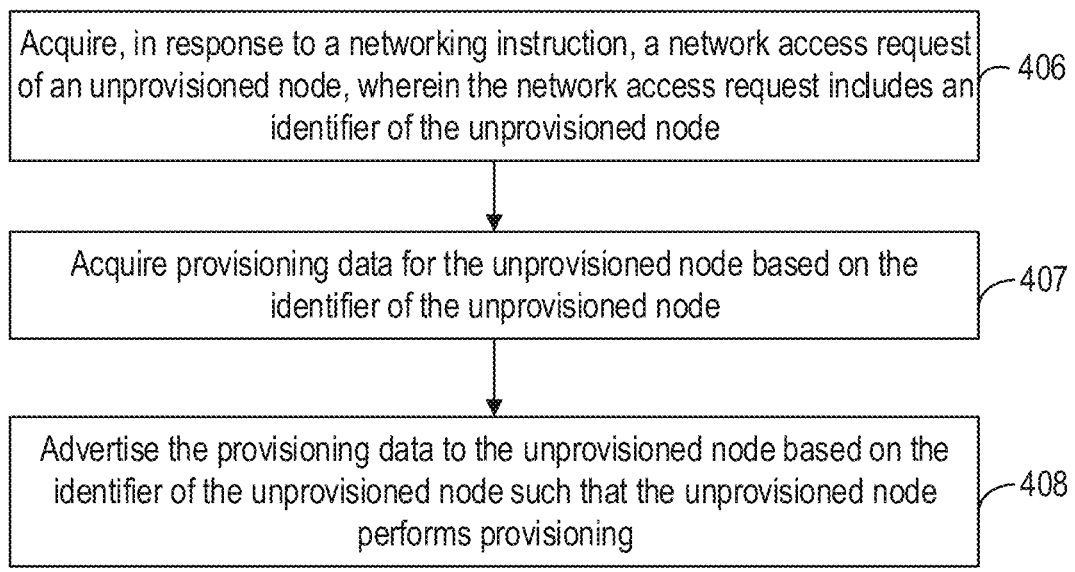
FIG. 4C is a flow diagram illustrating a method for provisioning an unprovisioned node requesting to join a Bluetooth network according to some embodiments of the disclosure.

FIG. 4C is a flow diagram illustrating a method for provisioning an unprovisioned node requesting to join a Bluetooth network, according to some embodiments of the disclosure. This method is described from the perspective of a leader node in the Bluetooth network. The method includes the following steps.

Step 406: acquire, in response to a networking instruction, a network access request of an unprovisioned node, the network access request including an identifier of the unprovisioned node.

Step 407: acquire provisioning data of the unprovisioned node based on the identifier of the unprovisioned node.

Step 408: advertise the provisioning data to the unprovisioned node based on the identifier of the unprovisioned node such that the unprovisioned node performs provisioning operation.

In some embodiments, the leader node is also configured for performing provisioning operation on an unprovisioned node requesting network access. A provisioning operation includes: acquiring, by a leader node and in response to a provisioning instruction, a network access request from an unprovisioned node, the network access request including an identifier of the unprovisioned node; acquiring provisioning data for the unprovisioned node based on the identifier of the unprovisioned node; and advertising the provisioning data to the unprovisioned node based the identifier of the unprovisioned node such that the unprovisioned node performs the provisioning.

According to various embodiments, a networking instruction can be transmitted to the leader node in various manners. In one example, the leader node is configured with the voice recognition capability, and a user sends a voice instruction of provisioning to the leader node. The leader node receives the voice instruction sent by the user and recognizes the request of provisioning, and in turn, initiates a provisioning process. In another example, the leader node supports interactions with another user terminal, and the user transmits a provisioning instruction to the leader node via the user terminal. After receiving the provisioning instruction, the leader node initiates a provisioning process. In yet another example, the leader node is provided with an electronic screen, and the user interacts with the leader node via the electronic screen. This way, the user inputs a provisioning instruction to the leader node via the electronic screen. After receiving the provisioning instruction, the leader node initiates a provisioning process.

Further, the leader node searches, in response to the networking instruction and by scanning within its signal coverage, for a network access request advertised by an unprovisioned node. If the leader node identifies a network access request by scanning within its signal coverage, the leader node acquires an identifier of the unprovisioned node from the network access request, acquires provisioning data for the unprovisioned node based on the identifier of the unprovisioned node, and transmits, in an advertising manner, the provisioning data for the unprovisioned node to the unprovisioned node. If the leader node does not find any network access request from an unprovisioned node by scanning within its signal coverage, the leader node advertises a relay instruction to instruct a master node within the signal coverage of the leader node to activate the relay capability. The master node, upon receiving the relay instruction, activates the relay capability to forward received network access request to the leader node using the relay capability.

In turn, the leader node receives the network access request relayed and received by the master node within the signal coverage of the leader node, the network access request being advertised by an unprovisioned device. The leader node acquires the identifier of the unprovisioned node from the network access request; and acquires the provisioning data for the unprovisioned node based on the identifier of the unprovisioned node. Then, the leader node packages the provisioning data and the identifier of the unprovisioned node in a network access response and advertises the network access response. The network access response is forwarded to an unprovisioned device by the master node within the signal coverage of the leader node such that the unprovisioned device performs networking operation.

Figure 5:
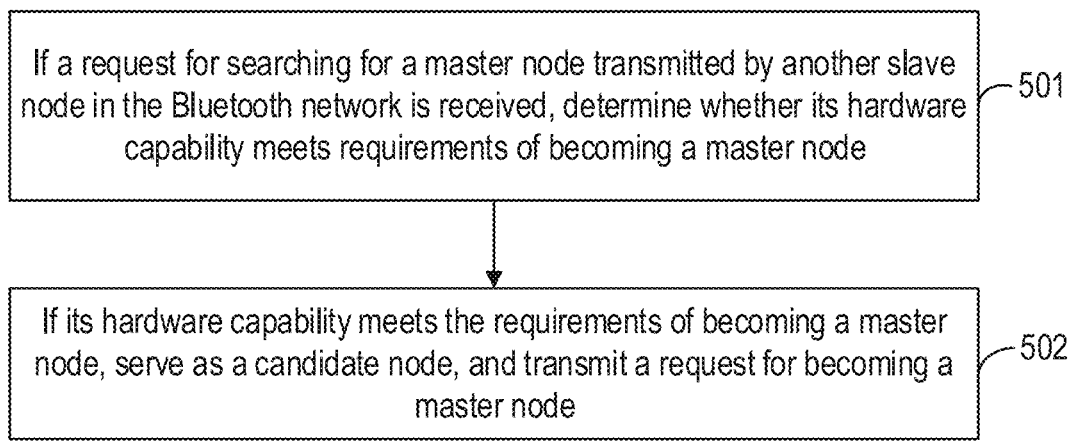
FIG. 5 is a flow diagram illustrating a method for selecting a master node from slave nodes of a Bluetooth network according to some embodiments of the disclosure.

FIG. 5 is a flow diagram illustrating a method for selecting a master node from slave nodes in a Bluetooth network, according to some embodiments of the disclosure. The method is described from the perspective of a slave node in the Bluetooth network. The communication method includes the following steps.

Step 501: if a request for searching for a master node transmitted by another slave node in the Bluetooth network is received, it is determined whether its own hardware capability meets the requirements of becoming a master node.

Step 502: if its own hardware capability meets the requirements of becoming a master node, serves as a candidate slave node, and transmits a request for becoming a master node.

In some embodiments, the slave node detects whether an available master node exists nearby. For all of N pieces of Bluetooth advertising data consecutively transmitted by the slave node, if no acknowledgment message is returned by a master node, it is determined that no available master node exists nearby the slave node. If an acknowledgment message (s) returned by master nodes node is/are received, it is determined that an available master node exists nearby. Here, N is a positive integer.

Further, if no available master node exists nearby the slave node, Bluetooth advertising data transmitted by the slave node cannot be forwarded. Thus, the slave node cannot communicate with another slave node, a master node, or an node beyond the signal coverage of the salve node. As such, if no available master node exists nearby, the slave node transmits a request for searching for a master node. In some embodiments, the request for searching for a master node is a type of Bluetooth advertising data.

Further, other slave nodes, within the signal coverage of the slave node searching for a master node, in turn receive the request advertised by the slave node for searching for a master node. Upon receiving the request transmitted by the slave node for searching for a master node, other slave nodes determine whether their hardware capability meets the requirements of becoming a master node. If so, other slave node serve as a candidate slave node, and transmit a request for becoming a master node. Otherwise, the received request for searching for a master node is discarded. If the slave node transmitting the request for becoming a master node is within the signal coverage of a leader node, the request transmitted by the slave node for becoming a master node directly reaches the leader node. If the slave node transmitting the request for becoming a master node is outside the signal coverage of the leader node, the request transmitted by the slave node for becoming a master node is forwarded by one or more master nodes to reach the leader node. Hardware capabilities of the candidate slave node includes, but is not limited to: CPU computing power, ROM storage capacity, and the like.

In some embodiments, the steps of the methods provided in embodiments of the disclosure are performed by the same device, or by different devices. In one example, step 406 to step 408 are performed by a device A. In another example, steps 407 and 408 are performed by device A, and step 408 is performed by a device B.

Further, the processes described in the foregoing embodiments and accompanying drawings illustrate a plurality of operations appearing in a specific order. However, these operations may be performed without following the order above-described, or they may be performed in parallel. Serial numbers of the operations such as 401 and 402 are only used to distinguish various different operations, not representing any performing order. Additionally, these processes may include more or fewer operations, and these operations may be performed in sequence or in parallel. It should be noted that the descriptions such as "first" and "second" herein are used to distinguish between different messages, devices, modules, and the like; they do not imply the precedence order or limit that the "first" and "second" are of different types.

Figure 6:
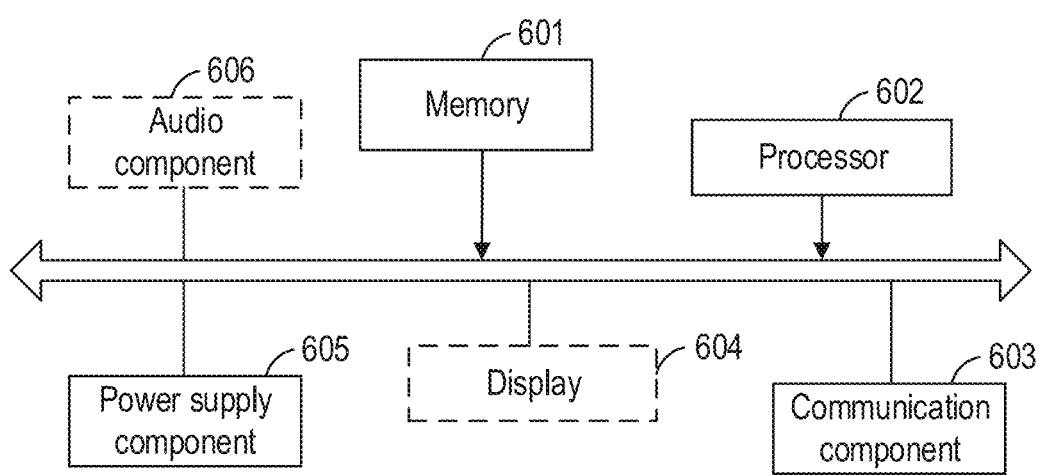
FIG. 6 is a block diagram illustrating a node device according to some embodiments of the disclosure.

FIG. 6 is a block diagram illustrating a node device according to some embodiments of the disclosure. In some embodiments, the node device is implemented as a non-leaf node in a Bluetooth network. In one embodiment, as shown in FIG. 6, the node device includes: a memory (601), a processor (602), and a communication component (603).

The memory is configured for storing a computer program and data to support operations on the node device. Such data includes, for example, instructions of applications or operations executing on the node device, contact data, phonebook data, messages, images, videos, and the like.

The processor (602) is coupled to the memory (601) and configured for executing the computer program stored in the memory (601) to: receive, via the communication component (603), Bluetooth advertising data from a leaf node in the Bluetooth network; and if the Bluetooth advertising data is not destined for the node device, advertise to forward the Bluetooth advertising data.

In some embodiments, the advertising to forward the Bluetooth advertising data by the processor (602) includes: checking a TTL value of the Bluetooth advertising data; and if the TTL value does not reach a configured threshold, increasing the TTL value by a configured step value; and advertising to forward the Bluetooth advertising data.

In some embodiments, the advertising to forward the Bluetooth advertising data by the processor (602) further includes: upon receiving Bluetooth advertising data not destined for the node device, comparing the Bluetooth advertising data with stored Bluetooth advertising data previously forwarded; if the Bluetooth advertising data is not same as the Bluetooth advertising data previously forwarded, advertising to forward the Bluetooth advertising data, and storing the Bluetooth advertising data; and if the Bluetooth advertising data is the same as the Bluetooth advertising data previously forwarded, discarding the Bluetooth advertising data.

In some embodiments, if the node device serves as a leader node in the Bluetooth network, the processor (602) is further configured for selecting a master node from at least one slave node included in the Bluetooth network.

In some embodiments, the selecting a master node from at least one slave node included in the Bluetooth network by the processor (602) includes: if a request transmitted by at least one candidate slave node for becoming a master node is received, selecting, from the at least one candidate slave node, a target slave node capable of becoming a master node; and notifying the target slave node to be configured as a master node, the at least one candidate slave node being part of or all of the at least one slave node.

In some embodiments, the selecting, from the at least one candidate slave node, a target slave node capable of becoming a master node by the processor (602) includes at least one of the following processes.

Process 1: selecting, from the at least one candidate slave node and based on the online time duration of the at least one candidate slave node, a target slave node capable of becoming a master node.

Process 2: selecting, from the at least one candidate slave node and based on the signal strength of the at least one candidate slave node, a target slave node capable of becoming a master node.

Process 3: randomly selecting, from the at least one candidate slave node, a target slave node capable of becoming a master node.

Process 4: selecting, from the at least one candidate slave node and based on the hardware capability of the at least one candidate slave node, a target slave node capable of becoming a master node.

In some embodiments, if the node device serves as a leader node in the Bluetooth network, the processor (602) is further configured for: performing provisioning operation on an unprovisioned node requesting network access, where after the provisioning operation, the unprovisioned node becomes a slave node in the Bluetooth network.

In some embodiments, the performing provisioning operation on an unprovisioned node requesting network access by the processor (602) includes: acquiring, in response to a networking instruction, a network access request of the unprovisioned node, the network access request including an identifier of the unprovisioned node; acquiring provisioning data of the unprovisioned node based on the identifier of the unprovisioned node; and advertising the provisioning data to the unprovisioned node based on the identifier of the unprovisioned node such that the unprovisioned node performs provisioning operation.

In some embodiments, the acquiring a network access request of the unprovisioned node by the processor (602) includes: searching, in response to the networking instruction and by scanning within its signal coverage, for a network access request advertised by an unprovisioned device; if no network access request is found by scanning, advertising a relay instruction to instruct a master node within its signal coverage to activate the relay capability; and receiving the network access request relayed by the master node within its signal coverage upon the master node receiving the network access request advertised by the unprovisioned device.

In some embodiments the advertising the provisioning data to the unprovisioned node by the processor (602) includes: packaging the provisioning data and the identifier of the unprovisioned node in a network access response, and advertising the network access response such that the master node within its signal coverage forwards the network access response to the unprovisioned device, and the unprovisioned device performs provisioning operation.

In some embodiments, as shown in FIG. 6, the node device further includes: a communication component (603), a display (604), a power supply component (605), an audio component (606), and other components. FIG. 6 only illustrates exemplary device components, not indicating that a node includes only the components shown in FIG. 6. Further, components in the dashed boxes in FIG. 6 are optional components rather than mandatory components. Optional components are selected specifically depend on the product form of the computing platform. In some embodiments, the computing platform (e.g., node device) is implemented as a terminal device such as a desktop, a laptop, a smart phone, an IoT device, a server device such as a conventional server, a cloud server, a server array, and the like. If the computing platform is implemented as a terminal device such as a desktop, a laptop, a smart phone, etc., the computing platform includes the components in the dashed boxes in FIG. 6. If the computing platform is implemented as a server device such as a conventional server, a cloud server, a server array, etc., the computing platform may not include the components in the dashed boxes in FIG. 6.

In some embodiment, computer-readable storage medium is provided to store a computer program that, when executed by a processor, implement the steps of the embodiments described with references to FIGS. 4A-4C.

Figure 7:
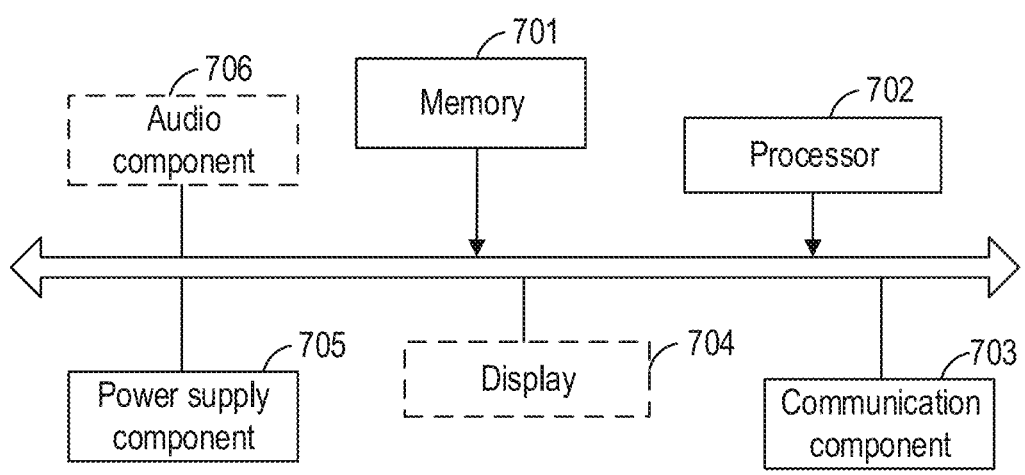
FIG. 7 is a block diagram illustrating an alternative node device according to some embodiments of the disclosure.

FIG. 7 is a block diagram illustrating another node device according to some embodiments of the disclosure. In some embodiments, the node device is implemented as a slave node in a Bluetooth network. In one embodiment, as shown in FIG. 7, the node device includes: a memory (701), a processor (702), and a communication component (703).

The memory (701) is configured for storing a computer program and data to support operations executed on the node device. Such data includes, for example, instructions for applications or operation executing on the node device, contact data, phonebook data, messages, images, videos, etc.

The processor (702) is coupled to the memory (701) and configured for executing the computer program stored in the memory (701) to: if a request for searching for a master node transmitted by another slave node in the Bluetooth network is received by the communication component (703), determine whether its own hardware capability meets the requirements of becoming a master node; and if its own hardware capability meets the requirements of becoming a master node, serve as a candidate slave node, and transmit a request for becoming a master node.

In some embodiments, after receiving a request for searching for a master node, the processor (702) is configured for: if its own hardware capability does not meet the requirements of becoming a master node, discarding the received request for searching for a master node.

In some embodiments, before transmitting a request for searching for a master node, the processor (702) is configured for: if no available master node is found nearby, transmitting a request for searching for a master node.

In some embodiments, before transmitting a request for searching for a master node, the processor (702) is configured for: if no acknowledgment message returned by a master node in response to all of consecutively transmitted N pieces of Bluetooth advertising data is received, determining that no available master node exists nearby, N being a positive integer.

In some embodiments, as shown in FIG. 7, the node device further includes: a communication component (703), a display (704), a power supply component (705), an audio component (706), and other components. The components are general-purpose components, the details of which are not repeated.

In some embodiments, disclosure computer-readable storage medium is provided to store a computer program that, when executed by a processor, implement the steps of embodiments described with reference to FIG. 5.

In various embodiments, the memory (601) in FIG. 6 and the memory (701) in FIG. 7 may be implemented by using any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

In various embodiments, the communication component in FIG. 6 and FIG. 7 is configured to facilitate wired or wireless communication between a device in which the communication component is located and other devices. The device in which the communication component is located can be connected to a wireless network based on a communication standard, such as a Wi-Fi, 2G, 3G, 4G/LTE, 5G mobile communication network or a combination thereof. In an exemplary embodiment, the communication component receives an advertisement signal or advertisement-related information from an external advertisement management system via an advertisement channel. In an exemplary embodiment, the communication component may further include a Near Field Communication (NFC) module, Radio Frequency Identification (RFID) technology, Infra-red Data Association (IrDA) technology, Ultra Wide Band (UWB) technology, Bluetooth (BT) technology, etc.

In various embodiments, the display in FIG. 6 and FIG. 7 may include a screen, which may include a Liquid Crystal Display (LCD) and a Touch Panel (TP). If the screen includes the touch panel, the screen may be implemented as a touch screen to receive input signals from a user. The touch panel includes one or a plurality of touch sensors to sense touches, swipes, and gestures on the touch panel. The touch sensors may not only sense a boundary of a touch or swipe action, but also detect a period of time and a pressure related to the touch or swipe operation.

In various embodiments, the power supply component in FIG. 6 and FIG. 7 supplies power to various components of the device in which the power supply component is located. The power supply component may include a power management system, one or a plurality of power sources, and other components associated with the generation, management, and distribution of power for the device in which the power supply component is located.

In various embodiments, the audio component in FIG. 6 and FIG. 7 is configured to output and/or input audio signals. For example, the audio component includes a microphone (MIC) configured to receive an external audio signal when a device in which the audio component is located is in an operation mode, such as a call mode, a recording mode, and a voice recognition mode. The received audio signal may further be stored in the memory or sent via the communication component. In some embodiments, the audio component further includes a speaker to output audio signals.

Those skilled in the art should understand that the embodiments of the disclosure may be provided as a method, a system, or a computer program product. Therefore, the present invention may use the form of a full hardware embodiment, a full software embodiment, or an embodiment combining software and hardware. Moreover, the present invention may use the form of a computer program product implemented on one or a plurality of computer-usable storage media (including, but not limited to, a magnetic disk memory, a CD-ROM, an optical memory, etc.) containing computer-usable program code therein.

The present invention is described with reference to flowcharts and/or block diagrams of a method, a device (system), and a computer program product according to the embodiments of the present invention. It should be understood that each procedure and/or block in the flowcharts and/or block diagrams, and a combination of procedures and/or blocks in the flowcharts and/or block diagrams may be implemented with computer program instructions. These computer program instructions may be provided to a processor of a general-purpose computer, a special-purpose computer, an embedded processor, or any other programmable data processing device to produce a machine, so that instructions executed by the processor of the computer or other programmable data processing device generate means for implementing a specified function in one or a plurality of procedures in the flowcharts and/or one or a plurality of blocks in the block diagrams.

These computer program instructions may also be stored in a computer-readable memory that can direct a computer or any other programmable data processing device to operate in a particular manner, so that the instructions stored in the computer-readable memory produce an article of manufacture including instruction means, the instruction means implementing a specified function in one or a plurality of procedures in the flowcharts and/or one or a plurality of blocks in the block diagrams.

These computer program instructions may also be loaded onto a computer or any other programmable data processing device so that a series of operational steps are performed on the computer or other programmable device to produce computer-implemented processing, and thus the instructions executed on the computer or other programmable device provide the steps for implementing a specified function in one or a plurality of procedures in the flowcharts and/or one or a plurality of blocks in the block diagrams.

In a typical configuration, the computing device includes one or a plurality of processors (CPUs), input/output interfaces, network interfaces, and memories.

The memory may include a computer-readable medium in the form of a non-permanent memory, a Random Access Memory (RAM) and/or non-volatile memory or the like, such as a Read-Only Memory (ROM) or a flash memory (flash RAM). The memory is an example of the computer-readable medium.

The computer-readable medium includes permanent and non-permanent, movable and non-movable media that can achieve information storage by means of any methods or techniques. The information may be a computer-readable instruction, a data structure, a module of a program, or other data. Examples of a storage medium of a computer include, but are not limited to, a Phase Change Memory (PRAM), a Static Random Access Memory (SRAM), a Dynamic Random Access Memory (DRAM), other types of Random Access Memories (RAMs), a Read-Only Memory (ROM), an Electrically Erasable Programmable Read-Only Memory (EEPROM), a flash memory or other memory technologies, a Compact Disk Read-Only Memory (CD-ROM), a Digital Versatile Disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The above descriptions are merely the embodiments of the disclosure, and are not intended to limit the disclosure. For those skilled in the art, the disclosure may have various alterations and changes. Any modifications, equivalent substitutions, improvements and the like made within the spirit and principle of the disclosure shall fall within the scope of the claims of the disclosure.

What is claimed is:

1. A system comprising:
a plurality of Bluetooth nodes, the plurality of Bluetooth nodes comprising:
one or more non-leaf nodes connected via a network, the one or more non-leaf nodes configured to forward Bluetooth advertising data to one or more nodes in the plurality of Bluetooth nodes; and
one or more leaf nodes operating in a Bluetooth advertising mode and configured to transmit the Bluetooth advertising data to the one or more non-leaf nodes and receive the Bluetooth advertising data from the one or more non-leaf nodes,
wherein the one or more non-leaf nodes include a leader node and one or more master nodes and the one or more one leaf nodes including at least one slave node, wherein the leader node is further configured to:
select a new master node from the at least one slave node; and
provision an unprovisioned node requesting network access, the unprovisioned node becoming a slave node after the networking operation.

2. The system of claim 1, the one or more non-leaf nodes configured to:
check, upon receiving second Bluetooth advertising data not destined for the one or more non-leaf nodes, a time to live (TTL) value of the second Bluetooth advertising data;
increase, if the TTL value does not reach a configured threshold, the TTL value by a configured step value; and
forward the second Bluetooth advertising data to one or more nodes in the plurality of Bluetooth nodes.

3. The system of claim 1, the one or more non-leaf nodes configured to:
compare, upon receiving second Bluetooth advertising data not destined for the one or more non-leaf nodes, the second Bluetooth advertising data with stored Bluetooth advertising data that has been previously forwarded;
forward, if the second Bluetooth advertising data does not match the Bluetooth advertising data that has been previously forwarded, the second Bluetooth advertising data to one or more nodes in the plurality of Bluetooth nodes; and
store the second Bluetooth advertising data.

4. The system of claim 1, the leader node configured to:
select, upon receiving a request transmitted by at least one candidate slave node for becoming a master node, a target slave node capable of becoming a master node; and
notify the target slave node to be configured as a master node.

5. The system of claim 4, the slave node further configured to:
determine, upon receiving a request transmitted by another slave node searching for a master node, whether a hardware capability of the slave node meets requirements of becoming a master node;
operate, in response to determining that the hardware capability meets the requirements of becoming a master node, as a candidate slave node; and
transmitting a request to the leader node to become a master node.

6. The system of claim 5, the slave node further configured to transmit, if no available master node exists in a signal coverage range, a request to search for a master node.

7. The system of claim 1, the leader node further configured to:
search, in response to a networking instruction and by scanning within a signal coverage rage, for a network access request advertised by an unprovisioned device;
advertise, if no network access request is found, a relay instruction to instruct a master node within a signal coverage range to activate a relay capability; and
receive the network access request relayed and forwarded by the master node within the signal coverage range, the network access request being advertised by the unprovisioned device.

8. The system of claim 7, the master node further configured to:
activate the relaying capability upon receiving the relay instruction; and
relay and forward the network access request to the leader node upon receiving the network access request advertised by the unprovisioned device.

9. The system of claim 1, further comprising a server, and the leader node further configured to:
transmit an identifier of an unprovisioned node to the server;
receive provisioning data for the unprovisioned node returned by the server; and
the server configured for receiving the identifier of the unprovisioned node transmitted by the leader node to generate the provisioning data for the unprovisioned node and return the provisioning data to the leader node.

10. The system of claim 9, further comprising a border routing node configured for forwarding communication data between the leader node and the server.

11. A method comprising:
receiving, at a non-leaf node of a Bluetooth network, Bluetooth advertising data from a leaf node in the Bluetooth network;
determining, by the non-leaf node, whether the Bluetooth advertising data is destined for the non-leaf node;
forwarding, by the non-leaf node and in response to determining that the Bluetooth advertising data is not destined for the non-leaf node, the Bluetooth advertising data to a second node of the Bluetooth network;
receiving, by the non-leaf node from at least one candidate slave node, a request for becoming a master node;
selecting, by the non-leaf node, a target slave node capable of becoming a master node; and
notifying, by the non-leaf node, the target slave node to be configured as a master node.

12. The method of claim 11, the selecting a target slave node comprising an operation selected from the group consisting of:

selecting, from the at least one candidate slave node and based on an online time duration associated with the at least one candidate slave node, the target slave node capable of becoming a master node;

selecting, from the at least one candidate slave node and based on a signal strength of the at least one candidate slave node, the target slave node capable of becoming a master node;

randomly selecting, from the at least one candidate slave node, a target slave node capable of becoming a master node; and selecting, from the at least one candidate slave node and based on hardware capability of the at least one candidate slave node, the target slave node capable of becoming a master node.

13. The method of claim 11, the non-leaf node comprising a leader node, and the method further comprising provisioning an unprovisioned node requesting access to the Bluetooth network, the unprovisioned node becoming a slave node in the Bluetooth network after the provisioning.

14. The method of claim 13, the provisioning an unprovisioned node requesting access to the Bluetooth network comprising:

acquiring, by the non-leaf node and in response to a provisioning instruction, a network access request of the unprovisioned node, the network access request comprising an identifier of the unprovisioned node;

acquiring, by the non-leaf node, provisioning data for the unprovisioned node based on the identifier of the unprovisioned node; and advertising, by the non-leaf node, the provisioning data to the unprovisioned node based on the identifier of the unprovisioned node such that the unprovisioned node performs provisioning operations.

15. The method of claim 14, the acquiring a network access request of the unprovisioned node comprising:

searching, by the non-leaf node, for a network access request advertised by an unprovisioned device in response to the provisioning instruction by scanning within a signal coverage range of the leader node;

advertising by the non-leaf node, a relay instruction to instruct a master node within the signal coverage range to activate relay capability if no network access request is found; and receiving, by the non-leaf node, the network access request relayed and forwarded by the master node within the signal coverage range, the network access request being advertised by the unprovisioned device.

16. A non-transitory computer-readable storage medium for tangibly storing computer program instructions capable of being executed by a computer processor, the computer program instructions defining steps of:

receiving Bluetooth advertising data from a leaf node in a Bluetooth network;

determining whether the Bluetooth advertising data is destined for a non-leaf node;

forwarding, in response to determining that the Bluetooth advertising data is not destined for the non-leaf node, the Bluetooth advertising data to a second node of the Bluetooth network;

selecting, if a request transmitted by at least one candidate slave node for becoming a master node is received, from the at least one candidate slave node, a target slave node capable of becoming a master node; and notifying the target slave node to be configured as a master node.

17. The computer-readable storage medium of claim 16, the selecting a target node further comprising an operation selected from the group consisting of:

selecting, from the at least one candidate slave node and based on an online time duration associated with the at least one candidate slave node, the target slave node capable of becoming a master node;

selecting, from the at least one candidate slave node and based on a signal strength of the at least one candidate slave node, the target slave node capable of becoming a master node;

randomly selecting, from the at least one candidate slave node, a target slave node capable of becoming a master node; and selecting, from the at least one candidate slave node and based on hardware capability of the at least one candidate slave node, the target slave node capable of becoming a master node.

* * * * *